US011199688B2

(12) United States Patent
Sakata et al.

(10) Patent No.: US 11,199,688 B2
(45) Date of Patent: Dec. 14, 2021

(54) STAGE APPARATUS

(71) Applicants: CANON KABUSHIKI KAISHA, Tokyo (JP); CANON PRECISION INC., Hirosaki (JP)

(72) Inventors: Tsuguhide Sakata, Machida (JP); Masahiro Ando, Yokohama (JP); Osamu Nagatsuka, Kawasaki (JP); Koichiro Nishikawa, Takasaki (JP); Koji Kimura, Tokyo (JP); Shigeki Sakurai, Yokohama (JP); Katsuyuki Tanaka, Tokorozawa (JP); Hiroki Kobayashi, Hirosaki (JP); Takuji Okamoto, Tokyo (JP)

(73) Assignees: Canon Kabushiki Kaisha, Tokyo (JP); Canon Precision Inc., Hirosaki (JP)

( * ) Notice: Subject to any disclaimer, the term of this patent is extended or adjusted under 35 U.S.C. 154(b) by 241 days.

(21) Appl. No.: 16/663,980

(22) Filed: Oct. 25, 2019

(65) Prior Publication Data
US 2020/0057292 A1    Feb. 20, 2020

Related U.S. Application Data

(63) Continuation of application No. PCT/JP2018/015835, filed on Apr. 17, 2018.

(30) Foreign Application Priority Data

Apr. 26, 2017 (JP) .............................. JP2017-087616

(51) Int. Cl.
*G02B 21/26* (2006.01)
(52) U.S. Cl.
CPC .................................. *G02B 21/26* (2013.01)

(58) Field of Classification Search
CPC ...... G02B 21/34; G02B 21/24; G02B 21/241; G02B 21/0036; G02B 21/244;
(Continued)

(56) References Cited

U.S. PATENT DOCUMENTS

| 2003/0202238 A1 | 10/2003 | Tsurumune et al. |
| 2014/0267669 A1* | 9/2014 | Stoops ..................... H04N 7/18 348/79 |

(Continued)

FOREIGN PATENT DOCUMENTS

| JP | 2002-328306 A | 11/2002 |
| JP | 2010-79171 A | 4/2010 |

(Continued)

OTHER PUBLICATIONS

Written Opinion and International Search Report issued in corresponding parent International Application No. PCT/JP2018/015835, dated Jul. 24, 2018.

*Primary Examiner* — Darryl J Collins
*Assistant Examiner* — Tamara Y. Washington
(74) *Attorney, Agent, or Firm* — Venable LLP

(57) ABSTRACT

A stage apparatus for a microscope includes a first stage provided on a mirror base of the microscope and fixed to a stage member that moves in an optical axis direction, a second stage that relatively moves over a surface of the first stage in a first direction, a third stage that relatively moves over a surface of the second stage in a second direction, the third stage having a placement portion for placing a microscope slide, and an exterior cover for covering at least a portion of the second stage and the third stage, the exterior cover being fixed to the first stage or the stage member. The exterior cover provides a space for the second stage and the third stage to move, and exposes the placement portion of the third stage.

17 Claims, 20 Drawing Sheets

(58) Field of Classification Search
CPC .... G02B 21/245; G02B 21/26; G02B 21/365; G02B 21/367; G02B 21/368; G02B 7/28; G02B 27/40; G06T 7/73; G06T 2207/10056; H04N 5/445
See application file for complete search history.

(56) References Cited

U.S. PATENT DOCUMENTS

| | | | |
|---|---|---|---|
| 2015/0177504 A1* | 6/2015 | Bickert | G02B 21/34 348/80 |
| 2016/0320598 A1* | 11/2016 | Dubois | G02B 21/33 |
| 2019/0107703 A1 | 4/2019 | Sakata et al. | |
| 2021/0181493 A1* | 6/2021 | Cramb | A61B 90/20 |

FOREIGN PATENT DOCUMENTS

| | | |
|---|---|---|
| JP | 2012-123203 A | 6/2012 |
| JP | 5620503 B2 | 11/2014 |
| JP | 2017-44819 A | 3/2017 |
| WO | 2011/047367 A1 | 4/2011 |

* cited by examiner

F I G. 6A
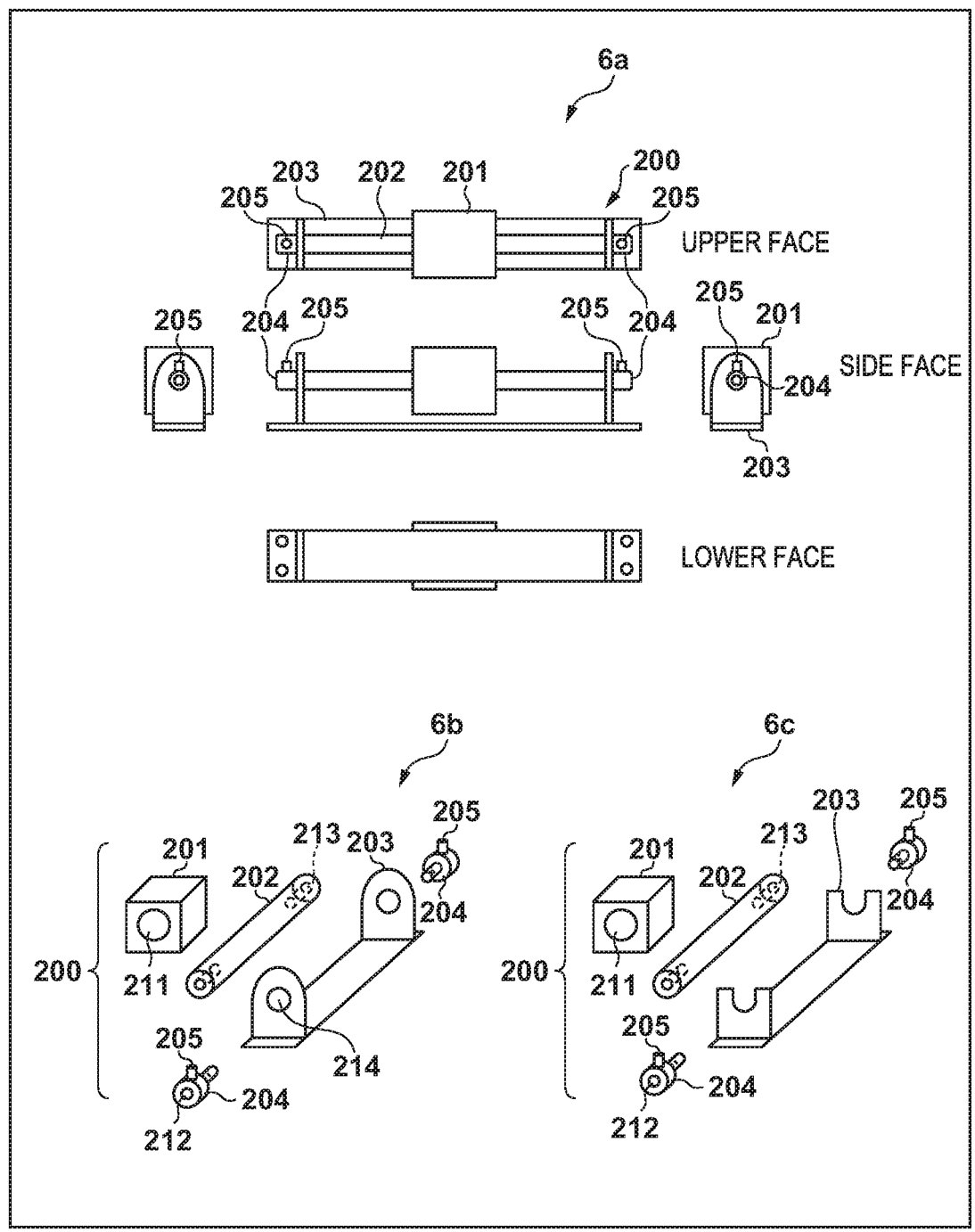

F I G. 6B
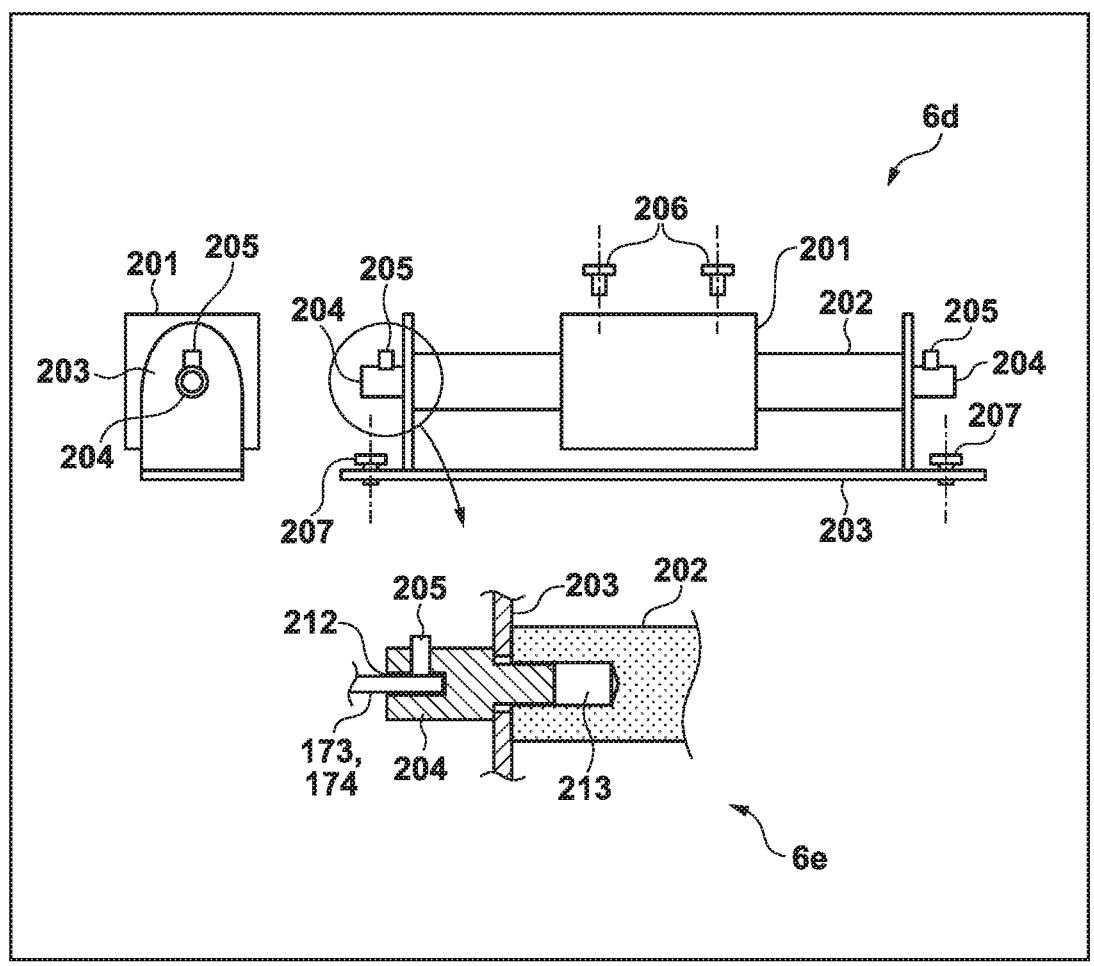

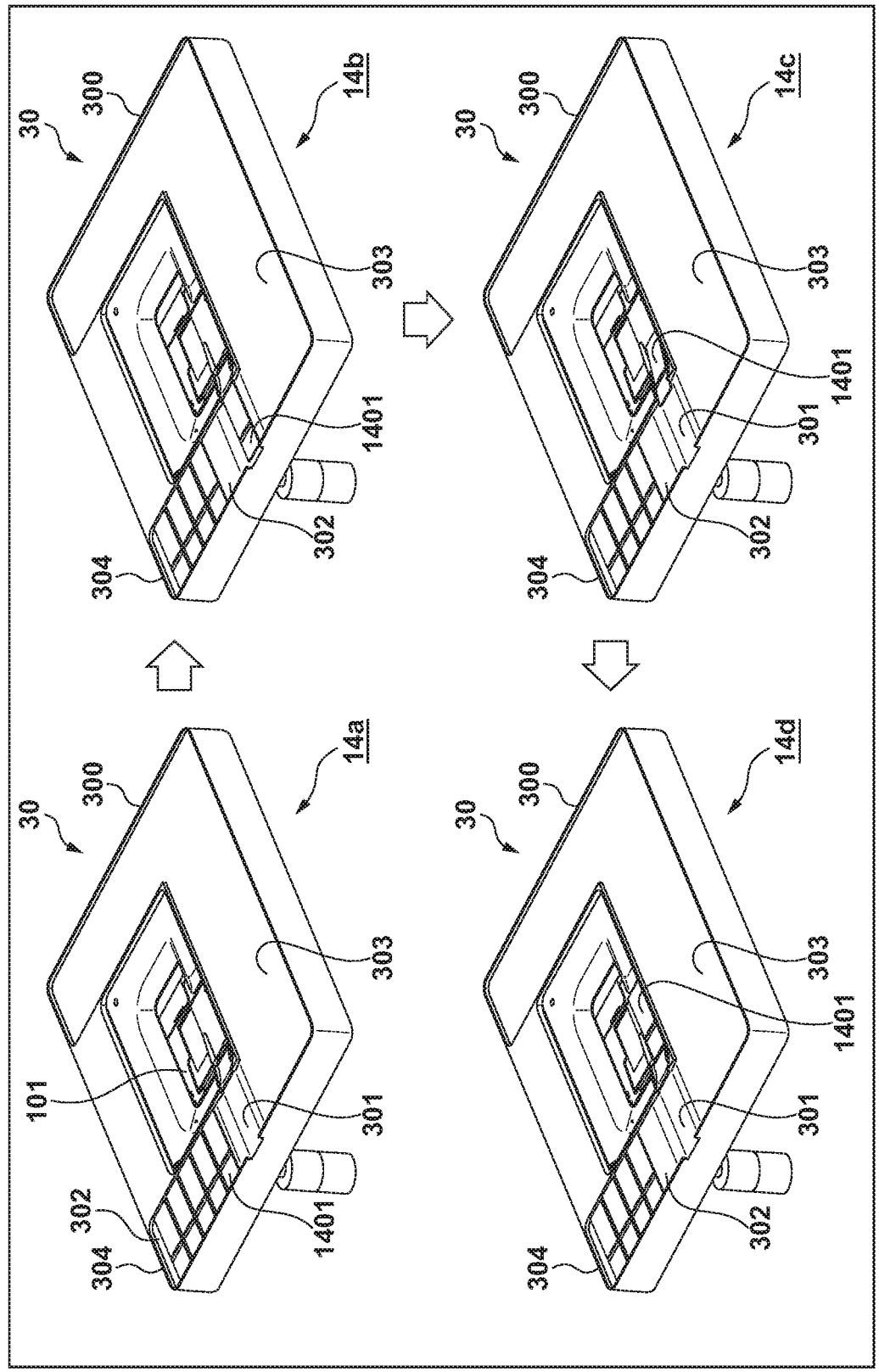

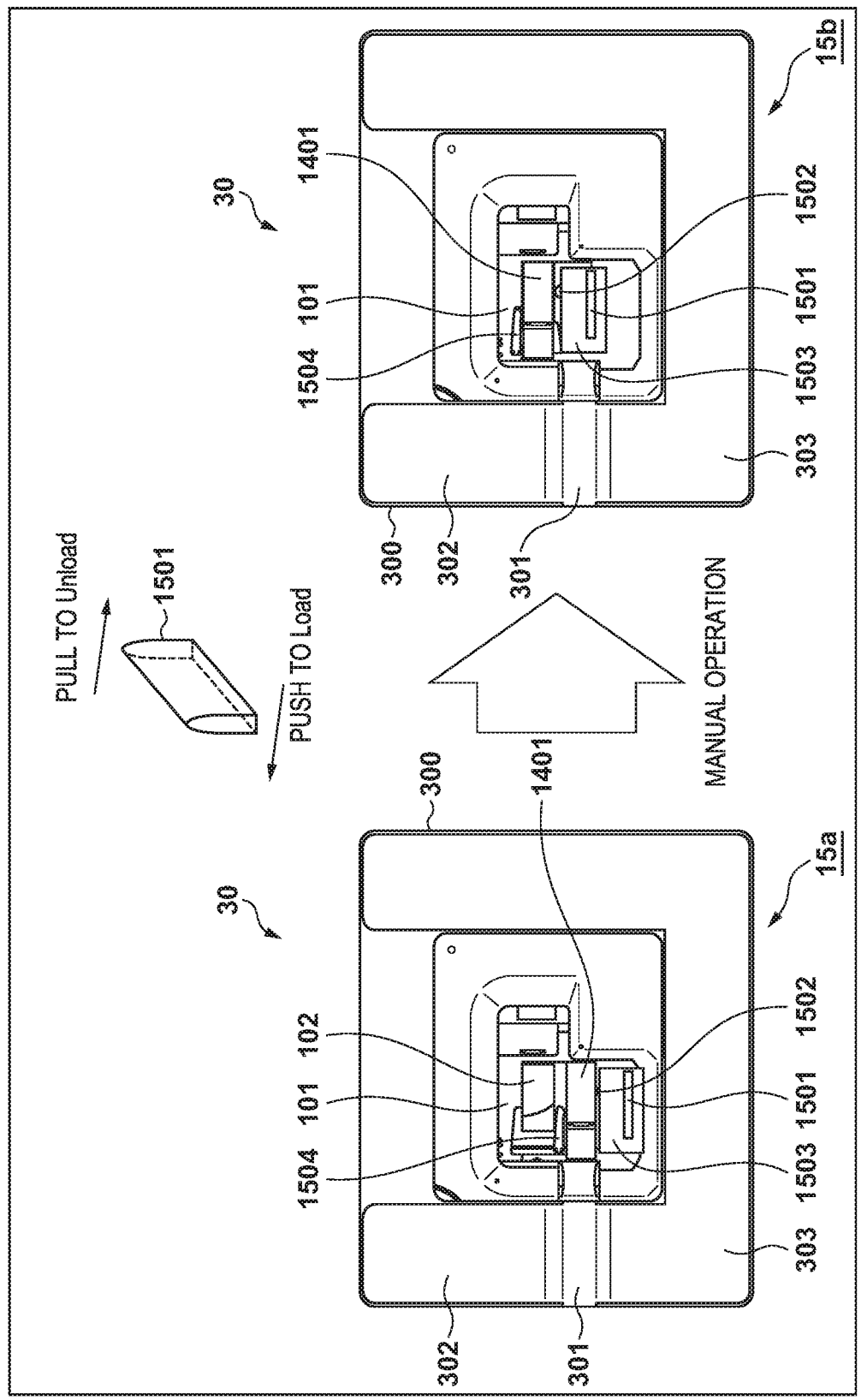

STAGE APPARATUS

CROSS-REFERENCE TO RELATED APPLICATIONS

This application is a Continuation of International Patent Application No. PCT/JP2018/015835, filed Apr. 17, 2018, which claims the benefit of Japanese Patent Application No. 2017-087616, filed Apr. 26, 2017, both of which are hereby incorporated by reference herein in their entirety.

BACKGROUND OF THE INVENTION

Field of the Invention

The present invention relates to a stage apparatus, and particularly relates to a stage apparatus for a microscope.

Background Art

A stage apparatus (hereinafter, "microscope stage") for use in a microscope receives a microscope slide to be observed placed thereon, and moves in x- and y-directions relative to an objective lens such that a desired observing region is in a microscope field of view. A microscope used in pathological diagnosis is particularly required to enable observation at the cell level, and is thus required to have high position management accuracy for the microscope stage. As for a means for operating a microscope slide in the x- and y-directions, accurate and precise operability and responsiveness are considered to be important, and therefore, a manual operation mechanism is used in which knobs for the x direction and the y direction are rotated by manual operation. By operating this manual operation mechanism, an x-stage and a y-stage move in the x direction and the y direction, respectively, relative to the microscope body, with the microscope slide placed thereon.

Meanwhile, Patent Literature 1 describes a motorized stage that uses a cylindrical linear motor and can be used as a microscope stage. In principal, this cylindrical linear motor is unlikely to cause backlash, and thus enables an observing position to be automatically controlled with high accuracy on the stage apparatus. Due to the control of this motorized mechanism, the x-stage and the y-stage move in the x direction and the y direction, respectively, relative to the microscope body, with the microscope slide placed thereon.

CITATION LIST

Patent Literature

PTL1: Japanese Patent No. 5620503

In existing microscope stages of either the manual operation type or the motorized type, the x-stage and the y-stage for moving the microscope slide in the x- and y-directions move relative to the microscope body. Ordinarily, in pathological diagnosis, microscope stages of the manual operation type are used to efficiently and sequentially observe a plurality of microscope slides. Also, depending on the results of observation, there are cases where a microscope slide on which a region of interest is present is temporarily placed on a flat portion on a top surface of the microscope stage, and other related microscope slides are observed. However, since the microscope slide that is temporarily placed on the stage is not fixed, there is concern that the microscope slide will fall off the stage during operations to move the other slides being observed in the x direction and the y direction, resulting in deterioration of operability.

Also, microscope stages are required to be able to realize an automatic mode using a motorized stage such as that of Patent Literature 1, in addition to the aforementioned manual mode. In the automatic mode, for example, the position of a region of interest observed in the manual mode is stored as xy coordinates, for example, and the observing position can be automatically returned quickly to the stored position with high accuracy. However, in the case of such a motorized stage as well, the x-stage and the y-stage move relative to the microscope body. For this reason, there is concern that a microscope slide that is temporarily placed on the aforementioned stage will fall off when a quick movement is made in the automatic mode.

Also, in the case of either the manual operation type or the motorized type, the xy-stage moves a microscope slide to an appropriate observing position with little movement. For this reason, the xy-stage is likely to be shifted in the x- and y-directions if an external force is applied thereon. A shift in the x- and y-directions directly leads to a shift in the observing position, and is therefore to be avoided as much as possible. As for the motorized xy-stage, there is also a demand for avoiding, as much as possible, contact between the x-stage and y-stage, which operate electrically, and an observer. Currently, the user needs to carefully avoid such contact with the xy-stage, which is a factor in deterioration of operability.

An object of an embodiment of the present invention is to provide a stage apparatus that further increases operability of a microscope.

Note that operations and effects that are derived by configurations described in later-described modes for carrying out the invention and that cannot be achieved by the conventional technique may also be defined as one of the other objects of this case.

SUMMARY OF THE INVENTION

According to one aspect of the present invention, there is provided a stage apparatus for a microscope comprising: a first stage provided on a microscope base stand of the microscope and fixed to a stage member that moves in an optical axis direction; a second stage that relatively moves over a surface of the first stage in a first direction; a third stage that relatively moves over a surface of the second stage in a second direction, the third stage having a placement portion for placing a microscope slide; and an exterior cover for covering at least a portion of the second stage and the third stage, the exterior cover being fixed to the first stage or the stage member, wherein the exterior cover provides a space for the second stage and the third stage to move, and exposes the placement portion of the third stage.

Further features of the present invention will become apparent from the following description of exemplary embodiments with reference to the attached drawings.

BRIEF DESCRIPTION OF THE DRAWINGS

The attached drawings are included in the specification and constitute a part of the specification, illustrate modes for carrying out the present invention, and are used to describe the principle of the present invention together with the description of the specification.

FIG. 6A illustrates an example of a structure of a linear actuator.

FIG. 6B illustrates an example of attachment of the linear actuator.

FIG. 14 illustrates an operation to load a microscope slide to a placement portion.

FIG. 15B illustrates a loading preparation position and a loading completion position of the placement portion.

DESCRIPTION OF THE EMBODIMENTS

Hereinafter, some preferable embodiments of the present invention will be described with reference to the attached drawings.

Figure 1A:
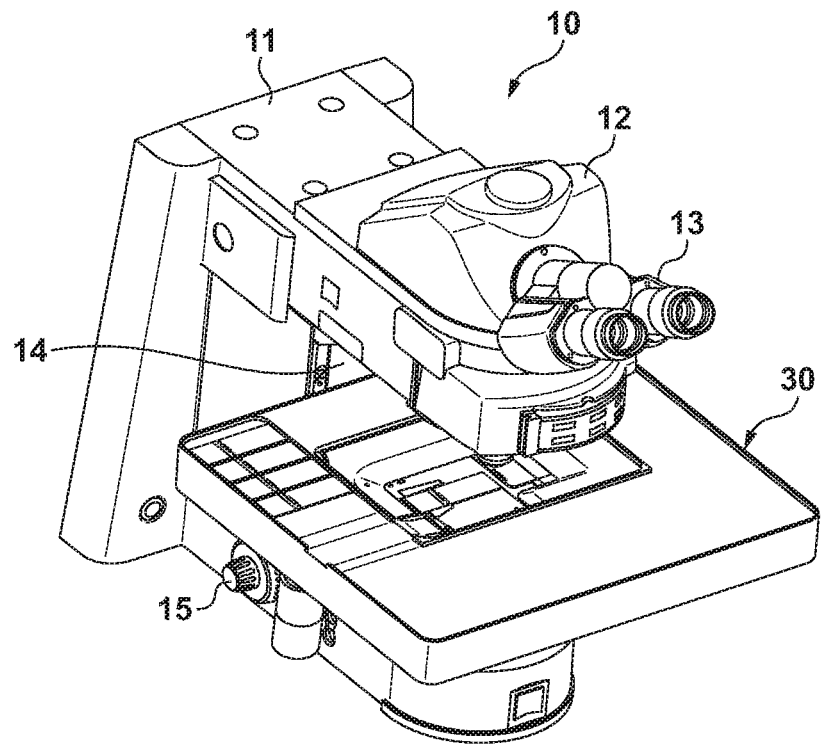
FIG. 1A shows an external appearance of a microscope according to an embodiment.
Figure 1B:
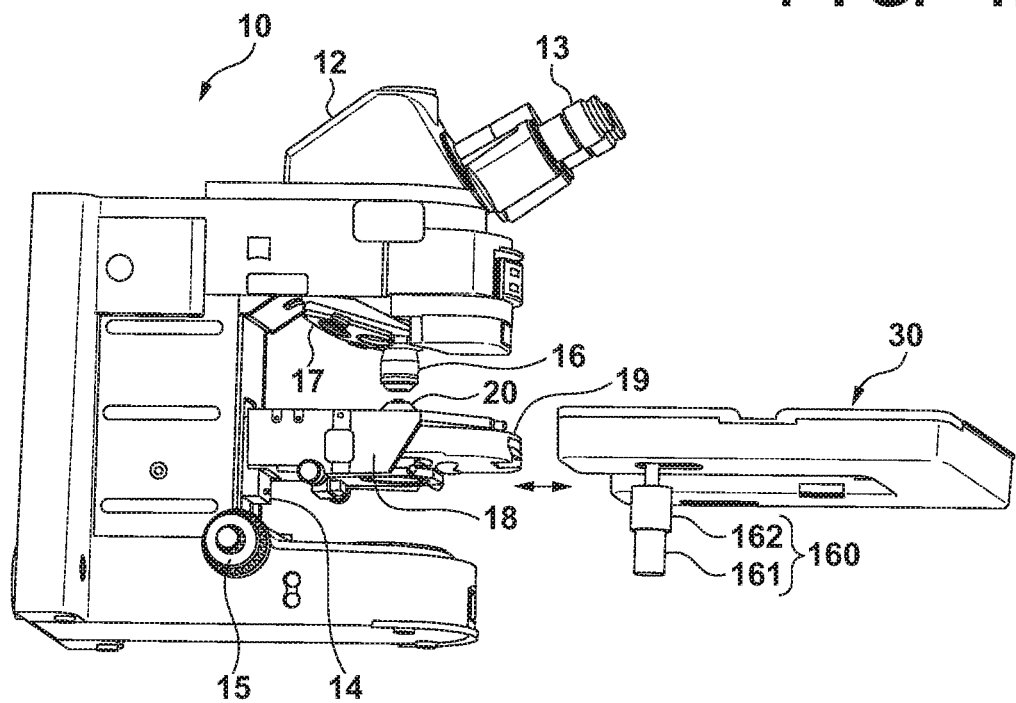
FIG. 1B shows an external appearance of the microscope according to the embodiment.

FIGS. 1A and 1B are external views showing a basic configuration of a microscope 10 according to an embodiment. FIG. 1A is a perspective view of the microscope 10. FIG. 1B is a perspective view showing a state where a stage apparatus 30 has been removed from a microscope base stand 11 of the microscope 10. In the microscope 10, the stage apparatus 30 is fixed to the microscope body (microscope base stand 11). The microscope base stand 11 is a sturdy body frame for attaching various structures to the microscope. An eyepiece base 12 is fixed to the microscope base stand 11, and connects an eyepiece barrel 13 (which is binocular in this example) thereto. A Z-knob 15 is a knob for moving a z-base 18 in a Z-axis direction (vertical direction). The stage apparatus 30 for moving a microscope slide to be observed in x- and y-directions is attached and fixed to the z-base 18. The z-base 18 is attached to the microscope base stand 11 via a z-base moving mechanism 14 for moving the z-base 18 in the z-direction in accordance with rotation of the Z-knob 15. 16 denotes an objective lens unit, and there are a plurality of types of units that correspond to optical magnifications. A revolver 17 has a structure to which the plurality of types of objective lens units 16 can be attached, and a desired objective lens unit can be selected for observation using the microscope, by rotating the revolver 17. A condenser unit 19 accommodates a condenser lens 20 for transmitted light illumination.

Figure 2:
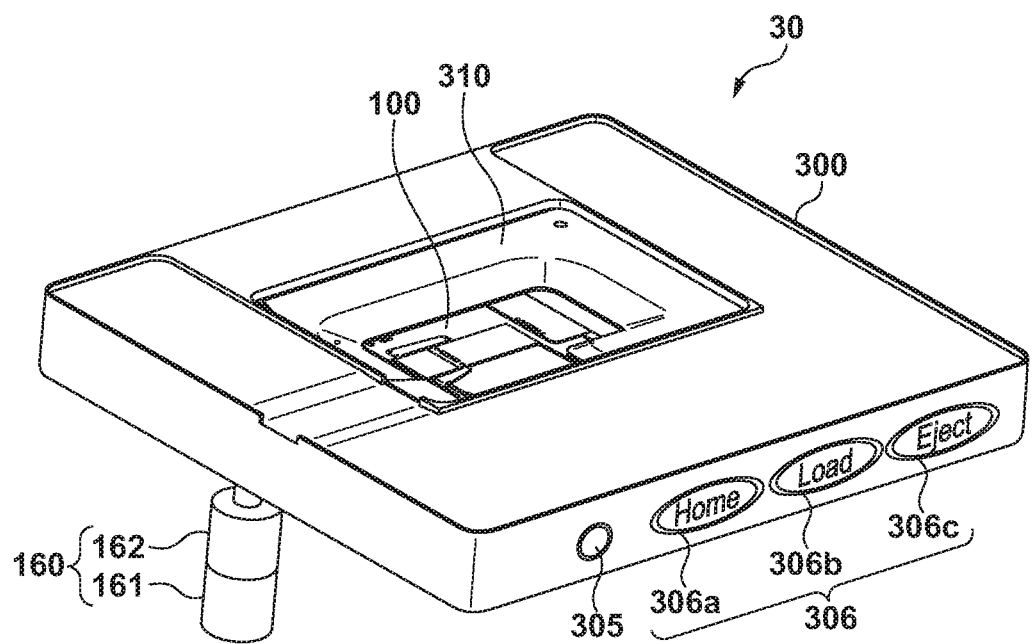
FIG. 2 shows an external appearance of a stage apparatus according to the embodiment.

FIG. 2 shows an external appearance of the stage apparatus 30. The stage apparatus 30 has a mode in which an xy-stage 100 is accommodated inside an exterior cover 300. The exterior cover 300 is fixed to a stage base 130 (FIG. 3), and does not move in either the x-direction or the y-direction relative to the stage base 130. Note that the exterior cover 300 may alternatively be directly fixed to the z-base of the microscope base stand 11. The exterior cover 300 is a structure that covers a y-stage 120, which relatively moves in the y-direction over a surface of the stage base 130, and an x-stage 110, which relatively moves in the x-direction over a surface of the y-stage 120 and has a mechanism for placing a microscope slide. The exterior cover 300 covers the y-stage 120 and the x-stage 110, including the entire moving areas thereof. The exterior cover 300 has a hole 310 for exposing a placement portion 101, which is a microscope slide placement mechanism on the x-stage 110. A user can place a microscope slide to be observed onto the placement portion 101 via the hole 310.

As mentioned above, the exterior cover 300 in this embodiment is fixed to the stage base 130. That is to say, the exterior cover 300 is fixed via the stage base 130 to the z-base 18, which is a stage member that is provided in the microscope base stand 11 of the microscope 10 and moves in an optical axis direction. A gap is always kept between the exterior cover 300 and the x-stage 110 and y-stage 120, and the exterior cover 300 does not come into contact therewith. For this reason, the exterior cover 300 does not move for operations of the xy-stage 100. Also, an external force applied to the exterior cover 300 does not affect the xy-stage 100. In the z-direction, the exterior cover 300 is fixed to the z-base 18 of the microscope 10, which is sturdy, and thus, the influence of a small external force is negligible. For this reason, a microscope slide placement area for placing a microscope slide can be provided on an upper face of the exterior cover 300, and operation buttons or the like can be installed on the surface of the exterior cover 300.

Figure 3:
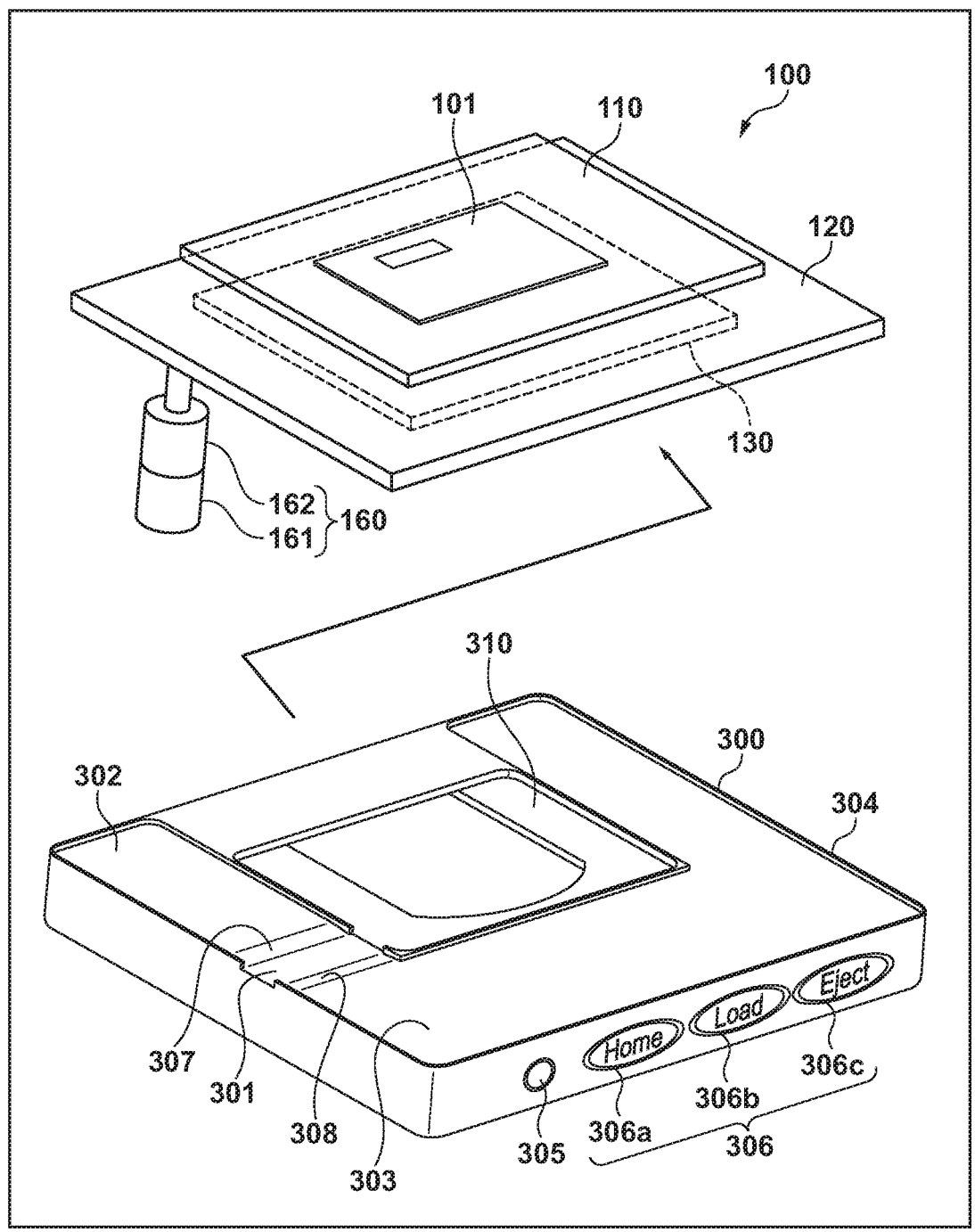
FIG. 3 shows external appearances of an xy-stage that constitutes the stage apparatus, and an exterior cover.

FIG. 3 shows a state of the stage apparatus 30 where the exterior cover 300 has been removed from the xy-stage. The exterior cover 300 for accommodating the xy-stage 100 has, on an upper face portion thereof, a first plate portion 301 for moving a microscope slide onto the placement portion 101 on the x-stage 110. Also, the upper face portion of the exterior cover 300 is provided with a second flat portion 302 and a third flat portion 303, for placing a microscope slide, the second flat portion 302 and the third flat portion 303 being provided with the first flat portion 301 sandwiched therebetween, at a position higher than the first flat portion 301. The first flat portion 301, the second flat portion 302, and the third flat portion 303 form a microscope slide placement area for placing a microscope slide before or after being observed.

The second flat portion 302 and the first flat portion 301 are connected to each other via a first slope portion 307, and the third flat portion 303 and the first flat portion 301 are connected to each other via a second slope portion 308. Accordingly, the user can readily move a microscope slide in the microscope slide placement area by sliding a microscope slide on the upper face of the exterior cover 300. The second flat portion 302, the third flat portion 303, the first slope portion 307, and the second slope portion 308 are provided with a wall portion 304 for preventing a microscope slide from falling off, the wall portion 304 extending along an outer edge of the exterior cover 300. The wall portion 304 provided in the microscope slide placement area reduces the likelihood that a microscope slide accidentally falls off while the xy-stage 100 is operating or the user is moving the microscope slide. Accordingly, the user can safely handle microscope slides on the upper face of the exterior cover 300. Note that two sides of the first flat portion 301 are continuously flat to the outer edge of the exterior cover 300, and in this area, the wall portion 304 is not present and the two sides of the first flat portion 301 are open in order to allow passage of a microscope slide. These openings allow the user to move a microscope slide onto the placement portion 101 and remove a microscope slide from the exterior cover 300.

For example, as shown in FIG. 1A, the user can place microscope slides yet to be observed onto the second flat portion 302. The user can slide a microscope slide on the second flat portion 302 on the upper face portion of the exterior cover 300 to move the microscope slide to the first flat portion 301, and further move the microscope slide from the first flat portion 301 to the placement portion 101. The user can also move an observed microscope slide from the placement portion 101 to the second flat portion 302, and move the microscope slide to the third flat portion 303.

A front panel of the exterior cover 300 is provided with operation switches 306 (which include a home button 306a, a load button 306b, and an eject button 306c in this example) for the user to give instructions, and an indicator 305. Although the embodiment has described an example in which the operation switches 306 and the indicator 305 are provided in the front panel of the exterior cover, this need not be the case, and the operation switches 306 and the indicator 305 may alternatively be provided on the upper face portion of the exterior cover 300, for example.

Figure 4:
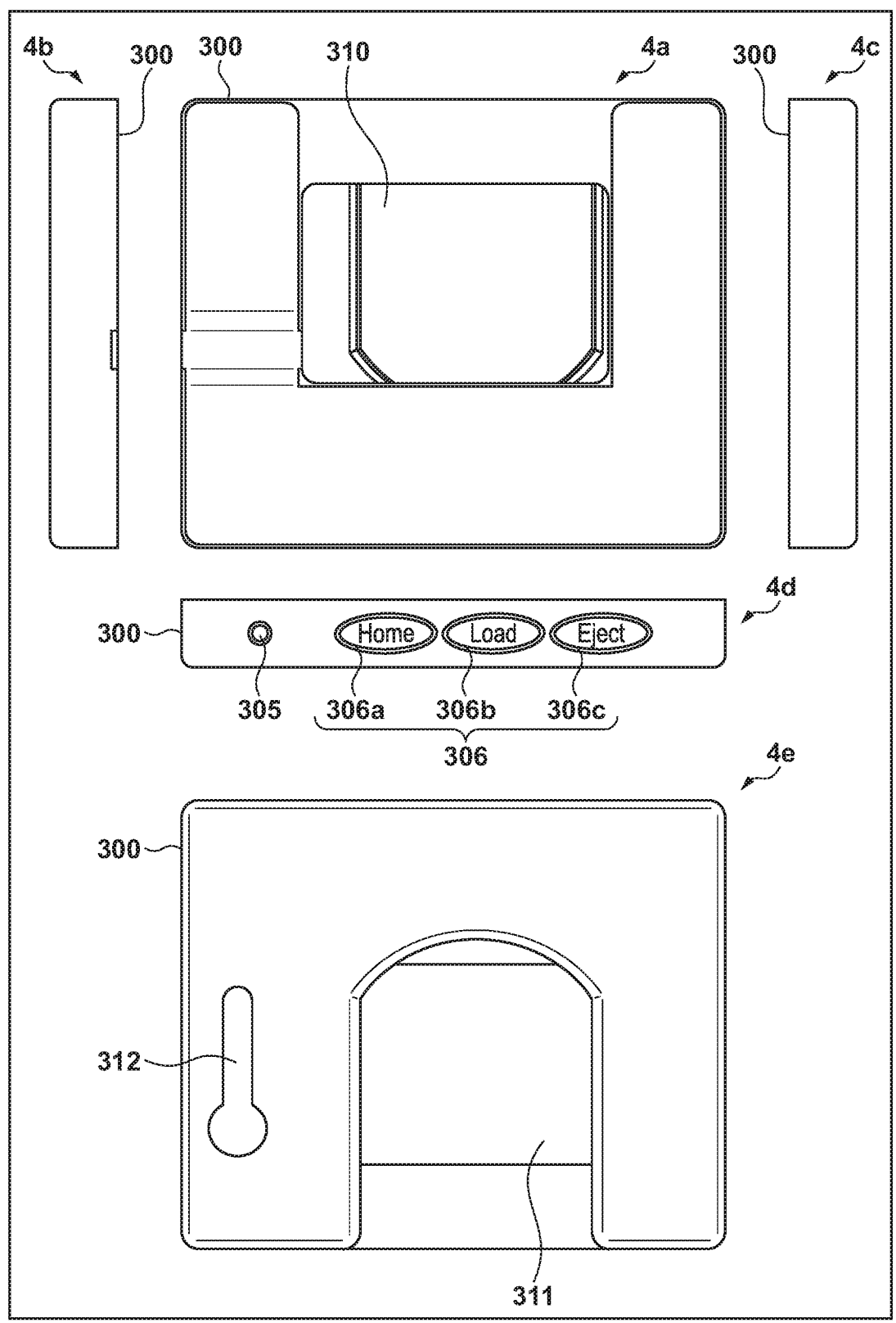
FIG. 4 shows the exterior cover.

FIG. 4 shows a top view (4a), left and right side views (4b and 4c), a front elevational view (4d), and a bottom view (4e) of the exterior cover 300. The upper face is provided with the microscope slide placement area, which surrounds three sides of the hole 310. The front face is provided with the indicator 305 and the operation switches 306. The bottom face is provided with a cutout 311 for avoiding interference with the condenser lens of the microscope. Also, the bottom face is provided with a hole 312 along a moving path in which a manual knob 160, which is provided on the y-stage 120, moves in accordance with movement of the y-stage 120.

Next, the xy-stage 100 will be described with reference to FIG. 3. The xy-stage 100 in this embodiment is a stage on which a slide to be observed is to be placed and that moves in the x-direction and the y-direction relative to the microscope base stand 11 of the microscope 10. The xy-stage 100 has a structure in which the stage base 130, the y-stage 120, and the x-stage 110 are stacked. Note that the order of stacking is not limited to the example in FIG. 3, and a configuration may alternatively be employed in which the y-stage 120 is provided above the x-stage 110. In the xy-stage 100, the y-stage 120 relatively moves in the y-direction over a surface of the stage base 130. The x-stage 110 relatively moves in the x-direction over a surface of the y-stage 120. Here, the stage base 130 corresponds to an example of a first stage, and the y-stage 120 corresponds to an example of a second stage. The x-stage 110 corresponds to an example of a third stage. The y-direction corresponds to an example of a first direction, and the x-direction corresponds to an example of a second direction. An upper face of the x-stage 110 is provided with the placement portion 101 for placing a microscope slide. The details of the placement portion 101 will be described later with reference to FIG. 15A.

More specifically, the stage base 130 is fixed to the z-base 18 of the microscope base stand 11 of the microscope 10. The y-stage 120 can move over the stage base 130 in the y-direction along y-axis cross roller guides 121a and 121b (which will be described later with reference to FIG. 5). The x-stage 110 can move over the y-stage 120 in the x-direction along x-axis cross roller guides 111a and 111b (which will be described later with reference to FIG. 5). As a result, an xy-stage is provided that can move the placement portion 101 provided on the x-stage 110 in two directions, namely the x-direction and the y-direction, relative to the stage base 130 (relative to the microscope base stand 11 of the microscope 10). The user can move the x-stage 110 in the x-direction by rotating an x-knob 161 of the manual knob 160, and can move the y-stage 120 in the y-direction by rotating a y-knob 162. Thus, the user can move the placement portion 101 in the x- and y-directions by operating the manual knob 160. The y-knob 162 corresponds to an example of a first driving unit.

Figure 5:
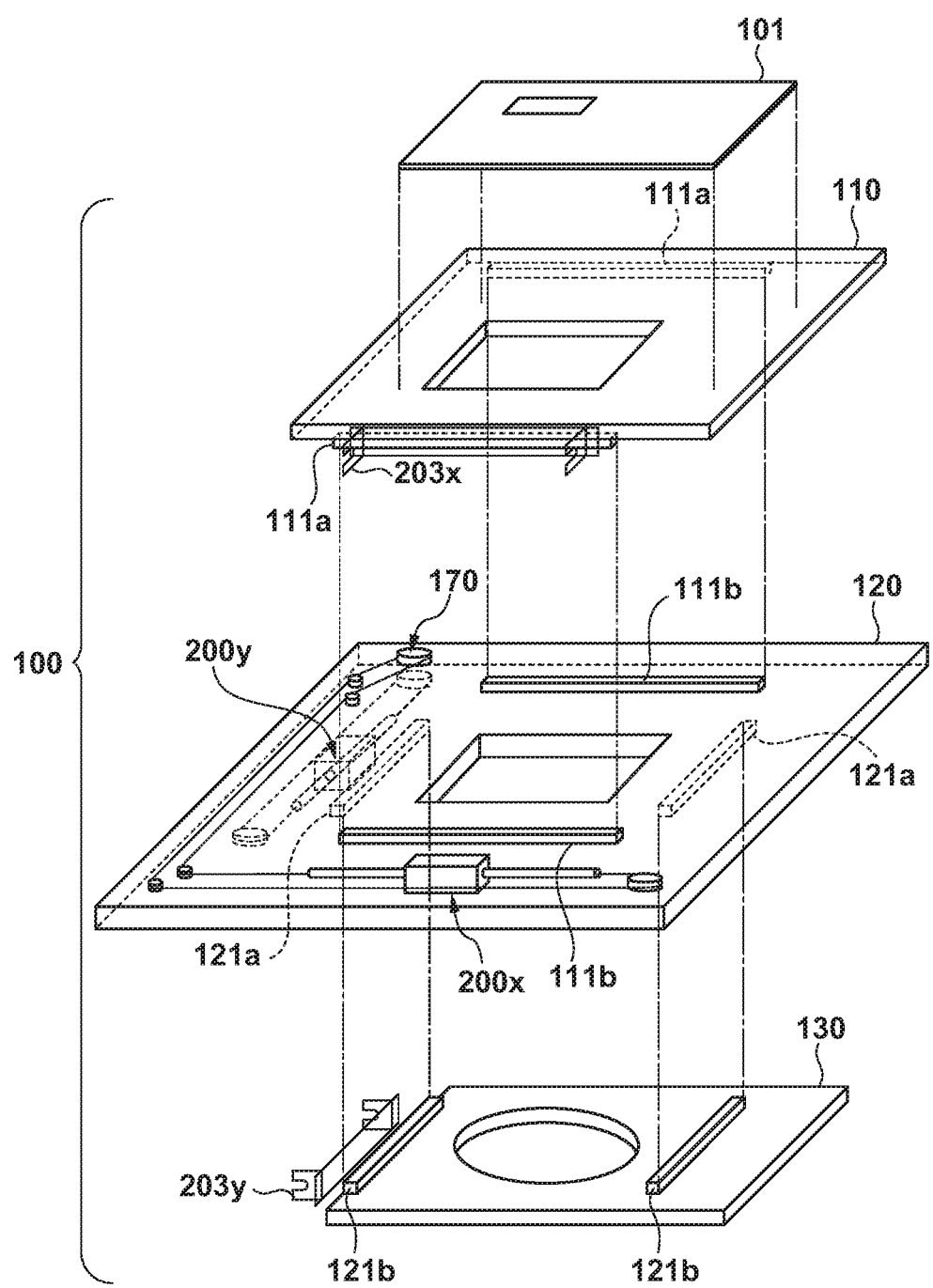
FIG. 5 shows an example of external appearances of an x-stage, a y-stage, and a stage base that constitute a stage apparatus 100.

FIG. 5 shows external appearances of the x-stage 110, the y-stage 120, and the stage base 130 that constitute the xy-stage 100.

The x-axis cross roller guides 111a, which are paired with the x-axis cross roller guides 111b that are arranged on the y-stage 120, are arranged on the x-stage 110. The y-axis cross roller guides 121b, which are paired with the y-axis cross roller guides 121a that are arranged on the y-stage 120, are arranged on the stage base 130. The two x-axis cross roller guides 111a are arranged so as to sandwich the two x-axis cross roller guides 111b from respective outer sides, and the two y-axis cross roller guides 121a are arranged so as to sandwich the two y-axis cross roller guides 121b from respective outer sides. The x-stage 110 can move over the surface of the y-stage 120 in the x-axis direction by fixing the x-axis cross roller guides 111a and 111b with cross rollers inserted therebetween. Similarly, the y-stage 120 can move over the surface of the stage base 130 in the y-axis direction by fixing the y-axis cross roller guides 121a and 121b with cross rollers inserted therebetween.

A driving mechanism for moving the x-stage 110 in the x-direction relative to the y-stage and a driving mechanism for driving the y-stage 120 in the y-direction relative to the stage base 130 are installed on the y-stage 120. A manual driving mechanism 170 drives a driven portion (a wire connected to the x-stage in this embodiment) for moving the x-stage 110 in the x-direction relative to the y-stage 120, using a manually-applied driving force. Similarly, the manual driving mechanism 170 drives a driven portion (a wire connected to the stage base 130 in this embodiment) for moving the y-stage 120 in the y-direction relative to the stage base 130. More specifically, operations to rotate the x-knob 161 and the y-knob 162 are converted to operations to move an x-wire 173 and a y-wire 174, which are shown in more detail in FIG. 7 and subsequent diagrams. The x-stage 110 moves in the x-direction relative to the y-stage 120 due to movement of the x-wire 173, and the y-stage 120 moves in the y-direction relative to the stage base 130 due to movement of the y-wire 174.

A linear actuator 200x for the x-direction is a linear actuator that provides a driving force for moving the x-stage 110 in the x-direction relative to the y-stage 120. A linear actuator 200y for the y-direction is a linear actuator that provides a driving force for moving the y-stage 120 in the y-direction relative to the stage base 130. The linear actuators 200x and 200y, which have similar structures, may also be referred to collectively as a linear actuator 200. When the linear actuator 200 is specified as that for the x-direction or for the y-direction, x or y follows the reference numeral.

FIG. 6A illustrates a structure of the linear actuator 200 according to this embodiment. In FIG. 6A, 6a denotes a diagram showing an upper face, a front face, a lower face, and side faces of the linear actuator 200, and 6b and 6c denote perspective views in which the linear actuator 200 is exploded into constituent elements. In FIG. 6B, 6d denotes a diagram illustrating attachment of the linear actuator 200. 6e denotes a diagram showing a cross-section of a portion of the linear actuator 200 denoted by 6d. The linear actuator 200 in this embodiment uses a so-called shaft motor (a linear motor using a shaft) that is constituted by an outer enveloping member 201 and a shaft 202, which is inserted into a hole penetrating the outer enveloping member 201. That is to say, the shaft 202 is fixed, using wire connecting portions 204, to large holes 214 provided in a frame 203, with the shaft 202 inserted into an open hole 211 in the outer enveloping member 201. When the xy-stage 100 is installed, the shaft 202 is fixed to the frame 203 using the wire connecting portions 204 such that driving wires (the x-wire 173 and the y-wire 174, which are shown more specifically in FIG. 7 and subsequent drawings) and the shaft 202 are coaxial with each other.

As a result of the above-described installation, the linear actuator 200 denoted by 6a and 6b in FIG. 6A is configured. As shown in the diagrams, the linear actuator 200 includes the outer enveloping member 201, the shaft 202 that is slidably inserted into the open hole 211 in the outer enveloping member 201, and the wire connecting portions 204 that provide a wire connection mechanism for fixing the shaft 202 to the frame 203 and connecting the driving wire. One of the outer enveloping member 201 and the shaft 202 has a coil, the other one has a magnet, and the member that includes the magnet is relatively moved relative to the coil by causing a current to flow through the member that has the coil. That is to say, in the linear actuator 200 according to this embodiment, which provides a driving force by being electrically driven, a so-called shaft motor (a linear motor using a shaft) constituted by the outer enveloping member 201 and the shaft 202 that is inserted into the hole penetrating the outer enveloping member 201 is fixed to the frame 203 when installed. In the linear actuator 200, the shaft 202 operates in its longitudinal direction (axial direction) in accordance with an electrical signal being given thereto.

The shaft 202 has a circular cross-section, and is incorporated, when installed, into the frame 203 in a state where the shaft 202 is inserted into the open hole 211 in the outer enveloping member 201. Two end portions of the shaft 202 are fixed to the frame 203 via the wire connecting portions 204. As denoted by 6d and 6e in FIG. 6B, one end of each wire connecting portion 204 is provided with a screw portion corresponding to a screw portion 213 provided in a corresponding end portion of the shaft 202, and the other end is provided with a hole portion 212 for fixing the wire. By inserting the driving wire (the later-described x-wire 173 or y-wire 174) into the hole portion 212 and fastening the driving wire using a wire fixing screw 205 from the radial direction, the driving wire is connected substantially coaxially with the shaft 202. Here, "coaxially" means a state where the central axis of the driving wire and the central axis of the shaft 202 coincide with each other. Note that, although FIG. 6B shows a mode of fixing the driving wire to the hole portion 212 using the wire fixing screw 205, the method for fixing the driving wire is not limited thereto. Any structure may be employed as long as the driving wire is fixed coaxially with the shaft 202, and for example, the driving wire may alternatively be fixed to the hole portion 212 by means of swaging. Alternatively, a configuration may be employed in which an end portion of the driving wire is inserted into a cylindrical hole provided at an end of a cylindrical pin, the cylindrical pin is fixed to the end portion of the driving wire by means of screwing or swaging, and the other end of this cylindrical pin is inserted into the hole portion 212 and is fixed by the wire fixing screw 205.

The outer enveloping member 201 is directly fixed to the y-stage 120 by outer enveloping member fixing screws 206, or is indirectly fixed thereto via an attachment member. The frame 203 is directly fixed to the x-stage 110 or the stage base 130 by frame fixing screws 207, or is indirectly fixed thereto via an attachment member. According to this configuration, the frame 203x of the linear actuator 200x for the x-direction is fixed to the x-stage 110. If the shaft 202x moves in the x-direction relative to the outer enveloping member 201x, the x-stage 110 moves in the x-direction relative to the y-stage 120. Similarly, the frame 203y of the linear actuator 200y for the y-direction is fixed to the stage base 130. If a shaft 202y moves in the y-direction relative to an outer enveloping member 201y, the y-stage 120 moves in the y-direction relative to the stage base 130.

Note that the mode of providing the linear actuators 200 and the attachment of the linear actuators 200 to the xy-stage 100 in this embodiment are not limited to the above-described mode. For example, stages to which the respective linear actuators 200 are to be attached may be provided with portions to which the outer enveloping member 201 and the shaft 202 are fixed. Also, as denoted by 6c in FIG. 6A, a configuration may alternatively be employed in which a shaft 202 that has the wire connecting portions 204 at two ends is inserted into and fixed to large U-shaped grooves provided in the frame 203. Thus, any configuration may be used as long as the wire for manual driving and the shaft 202 for electrical driving are attached to the stage apparatus so as to be coaxial with each other and such that the axial directions of the wire for manual driving and the shaft 202 for electrical driving are parallel to the direction in which a corresponding stage moves.

Figure 7:
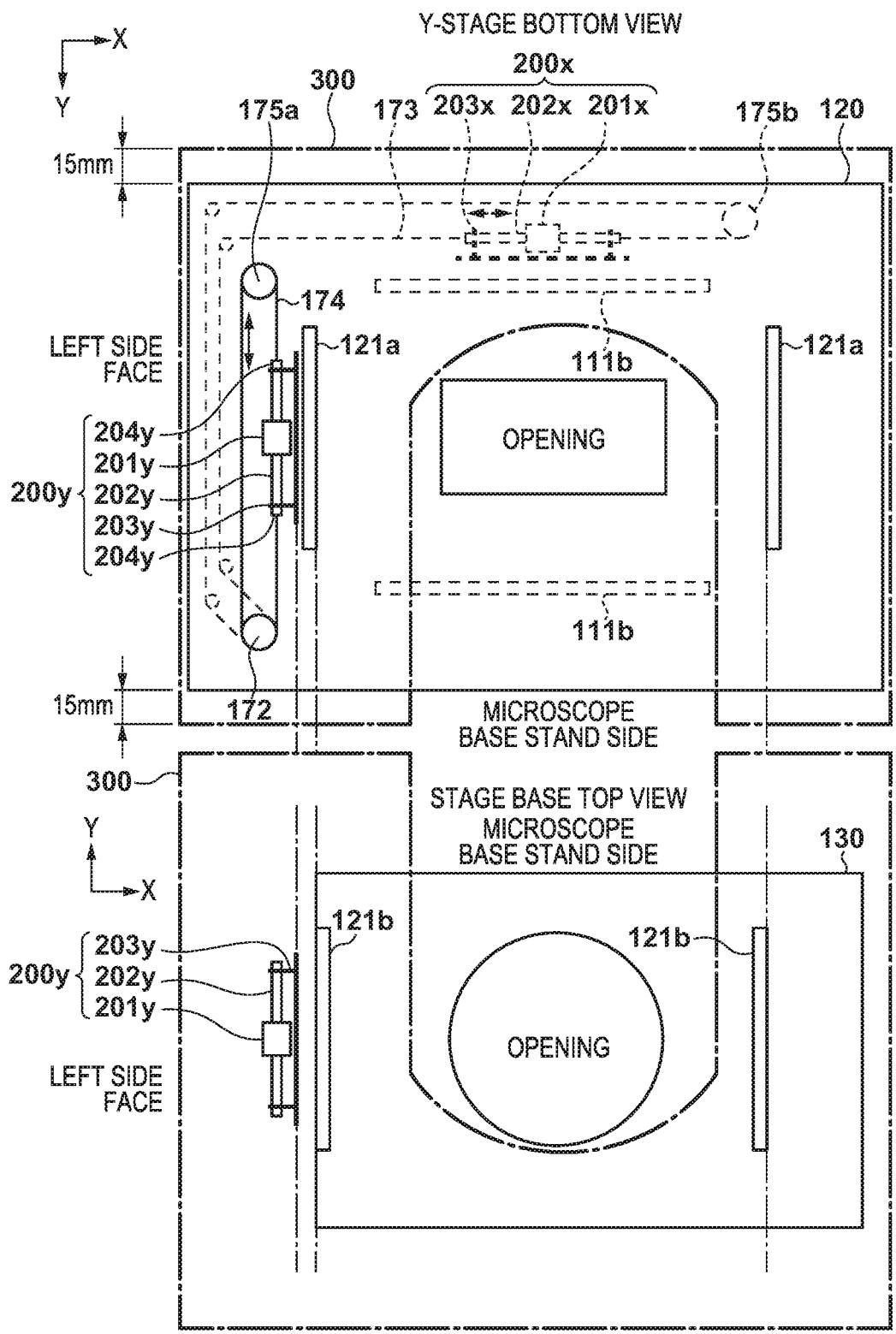
FIG. 7 shows an example of arrangement of constituent components on a lower face of the y-stage and an upper face of the stage base.

FIG. 7 schematically shows an arrangement of constituent components associated with the driving of the stages on a lower face of the y-stage 120 and an upper face of the stage base 130. Note that, since FIG. 7 is a schematic view for illustrating the arrangement of the constituent components, the size, the position, and the shape of the openings provided in the stages, the arranging positions and the size of the constituent components, and so on, do not necessarily coincide with those in the configuration diagrams of the stages shown in FIGS. 3 and 5.

The y-axis cross roller guides 121a and the outer enveloping member 201y of the linear actuator 200y are fixed to the lower face of the y-stage 120. The y-wire 174 is wound around a y-pulley 172 and a pulley 175a, the linear actuator 200y is installed such that the y-wire 174 and the shaft 202y are coaxial with each other, and the y-wire 174 is connected to the wire connecting portions 204y. The y-pulley 172 rotates in accordance with a manual operation performed on the y-knob 162, and the y-wire 174 operates due to rotation of the y-pulley 172. The shaft 202y is fixed to the frame 203y. The frame 203y is fixed to the stage base 130 (via a bracket (not shown), if necessary). The y-axis cross roller guides 121b are arranged on the upper face of the stage base 130. The y-axis cross roller guides 121a are configured to hold the y-axis cross roller guides 121b from outer sides thereof, and the y-stage 120 can move in the y-direction relative to the stage base 130. Here, the outer enveloping member 201y corresponds to an example of a second driving unit, and the shaft 202y corresponds to an example of a second driven portion.

In the above-described configuration, if the shaft 202y is moved in the y-direction relative to the outer enveloping member 201y, the y-stage 120 moves in the y-direction (along the y-axis cross roller guide 121) relative to the stage base 130. Since the linear actuator 200y moves the shaft 202y in accordance with a current flowing through the coil in the outer enveloping member 201y, the y-stage 120 can be moved in the y-direction relative to the stage base 130 by means of the driving force of the linear actuator 200y. Also, the rotating force exerted by a manual operation made on the y-knob 162 is converted to a rotating force of the y-pulley 172 in the manual driving mechanism 170, and moves the y-wire 174. Since the y-wire 174 is connected to the stage base 130 via the wire connecting portions 204 and the frame 203y, the movement of the y-wire 174 relatively moves the stage base 130 in the y-direction relative to the y-stage 120. As a result, the y-stage 120 moves in the y-direction relative to the stage base 130. The y-wire 174 corresponds to an example of a first driven portion.

In FIG. 7, the position at which the exterior cover 300 is attached is indicated by dash-dot lines. The exterior cover 300 is fixed to the stage base 130. The stage base 130 is fixed to the z-base 18, and, as a result, the exterior cover 300 is fixed to the z-base 18. The z-base 18 is a stage that is incorporated in a solid microscope base stand and can move in the z-direction. By fixing the exterior cover 300 to the z-base 18, an external impact is kept from being applied to the xy-stage 100.

Figure 8:
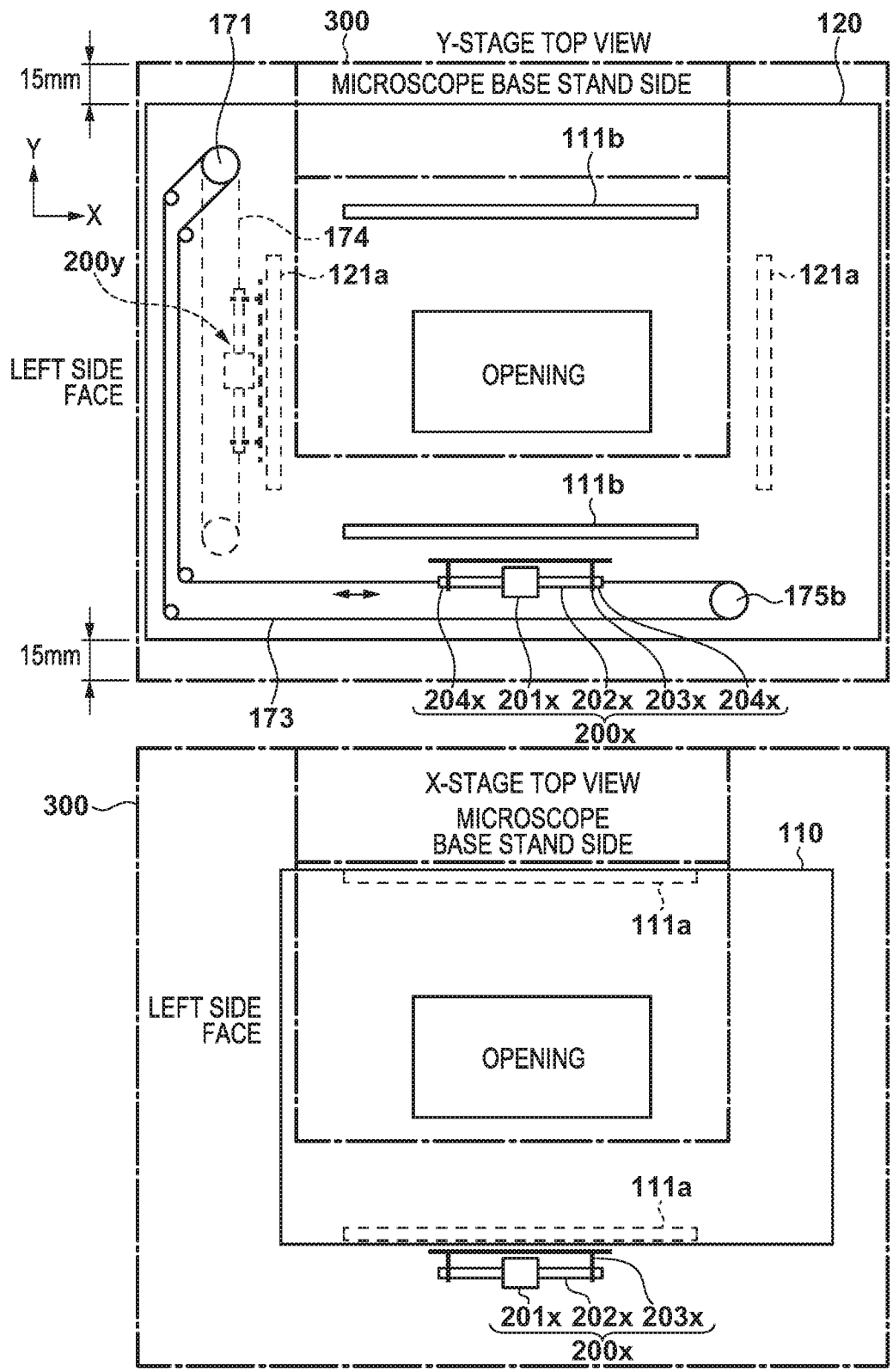
FIG. 8 shows an example of arrangement of constituent components on an upper face of the y-stage and an upper face of the x-stage.

FIG. 8 schematically shows an arrangement of constituent components associated with driving of the stages on an upper face of the y-stage 120 and the x-stage 110. Note that, similarly to FIG. 7, FIG. 8 is also a schematic diagram for illustrating the arrangement of the constituent components, and the size, the position, and the shape of the openings provided in the stages, the arranging positions and the size of the constituent components, and so on, do not necessarily coincide with those in the configuration diagrams of the stages shown in FIGS. 3 and 5. In FIG. 8 as well, the position at which the exterior cover 300 is attached is indicated by dash-dot lines.

The x-axis cross roller guides 111b and the outer enveloping member 201x of the linear actuator 200x are fixed to the upper face of the y-stage 120. The x-wire 173 is wound around an x-pulley 171 and a pulley 175b, the linear actuator 200x is installed such that the x-wire 173 and the shaft 202x are coaxial with each other, and the x-wire 173 is connected to wire connecting portions 204x. The x pulley 171 rotates in accordance with a manual operation performed on the x-knob 161, and the x-wire 173 operates due to rotation of the x-pulley 171. The shaft 202x is fixed to the frame 203x, and the frame 203x is fixed to the x-stage 110 (via a bracket (not shown), if necessary). The x-axis cross roller guides 111a are arranged on the lower face (the face opposing the upper face of the y-stage 120) of the x-stage 110. The x-cross roller guides 111a are configured to hold the x-axis cross roller guides 111b from outer sides thereof, and the x-stage 110 can move in the x-direction relative to the y-stage 120.

In the above-described configuration, if the shaft 202x is moved in the x-direction relative to the outer enveloping member 201x, the x-stage 110 moves in the x-direction (along the x-axis cross roller guide 111) relative to the y-stage 120. Since the linear actuator 200x moves the shaft 202x in accordance with a current flowing through the coil in the outer enveloping member 201x, the x-stage 110 can be moved in the x-direction relative to the y-stage 120 by means of the driving force of the linear actuator 200x. Also, the rotating force exerted by a manual operation made on the x-knob 161 is converted to a rotating force of the x-pulley 171 in the manual driving mechanism 170, and moves the x-wire 173. The wire connecting portions 204 and the frame 203x that are coaxially connected to the x-wire 173 also move in the x-direction in accordance with movement of the x-wire 173, and the x-stage 110, to which the frame 203x is fixed, moves. As a result, the x-stage 110 moves in the x-direction relative to the y-stage 120 due to the manual operation.

On the xy-stage 100 in this embodiment, the shaft 202x of the linear actuator 200x and the x-wire 173 are coaxial with each other. For this reason, the operational axis of the shaft 202x serving as a driven portion that operates in accordance with a driving force exerted by electrical driving, and the operational axis of the x-wire 173 that operates in accordance with a manually-applied driving force are at least partially the same. Here, the operational axes that are the same are parallel to the x-direction, which is defined by the x-axis cross roller guides 111. By thus making the operational axes for the electrical driving and the manual driving the same as each other, slight movement of the x-stage 110 can be reduced that occurs at the time of switching between electrical driving and manual driving. Accordingly, an observer of the microscope can switch between electrical driving and manual driving at any timing without any stress. As to the y-stage 120 and the stage base 130 as well, since the shaft 202y of the linear actuator 200y and the y-wire 174 are arranged coaxially, slight movement of the y-stage 120 is reduced that occurs at the time of switching between electrical driving and manual driving. Note that the switching between electrical driving and manual driving is performed by the manual driving mechanism 170, and a configuration thereof will be described later with reference to FIG. 13.

Figure 9:
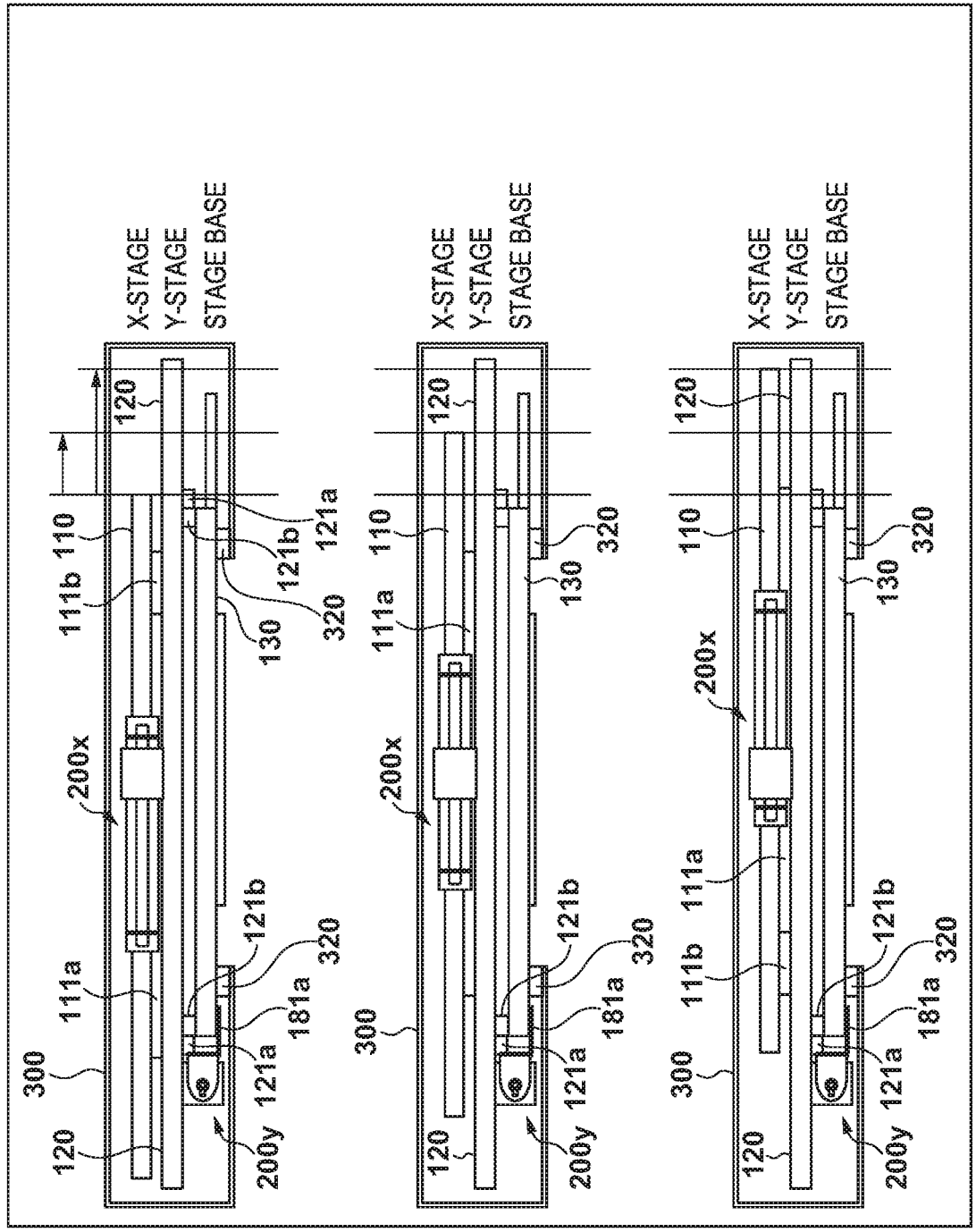
FIG. 9 illustrates an example of a stacking state of the x-stage, the y-stage, and the stage base.

Next, a stacking state of the x-stage 110, the y-stage 120, and the stage base 130 will be described with reference to FIG. 9. As shown in FIG. 9, the x-stage 110, the y-stage 120, and the stage base 130 are stacked in the z-direction. The y-stage 120 is stacked on the stage base 130 so as to be able to move thereon in the y-direction, via the y-axis cross roller guides 121a fixed to the lower face of the y-stage 120 and the y-axis cross roller guides 121b fixed to the upper face of the stage base 130. Similarly, the x-stage 110 is stacked on the y-stage 120 so as to be able to move thereon in the x-axis, via the x-axis cross roller guides 111a fixed to the lower face of the x-stage 110 and the x-axis cross roller guides 111b fixed to the upper face of the y-stage 120. FIG. 9 shows a state where the x-stage 110 has been moved in the x-direction relative to the y-stage 120.

Also, the outer enveloping member 201y of the linear actuator 200y is directly fixed to the lower face of the y-stage 120, and the frame 203y is fixed to the stage base 130 via an L-shaped bracket 181a. Thus, by fixing the frame 203y such that the bottom face of the frame 203y is perpendicular to the face of the stage base 130, the linear actuator 200y can be arranged in a space that is restricted in the height direction of the stage base 130 and the y-stage 120.

As mentioned above, in this embodiment, the size of the y-stage 120 (second stage) is the largest, on which two shaft motors for driving in the x- and y-directions and the manual driving mechanism 170 are installed. Meanwhile, since a microscope slide is observed while being placed horizontally, the direction in which a microscope slide is placed on the stage apparatus is preferably also horizontal. In this case, due to the shape of a microscope slide, the amount by which the microscope slide is to be moved in the y-direction (e.g. 25 mm, i.e. about 1 inch, which is the width of a microscope slide) is smaller than the amount by which the microscope slide is to be moved in the x-direction (e.g. 50 mm, which is the length of a microscope slide excluding a label area). Accordingly, if the second stage is the y-stage 120 that moves in the y-direction, the exterior cover 300 for covering the xy-stage 100 can be made smaller.

The exterior cover 300 encompasses the xy-stage 100 (the stage base 130, the y-stage 120, and the x-stage 110), and is fixed to the stage base 130 via an attachment member 320. In this embodiment, the size of the x-stage 110 in the x-direction is sufficiently smaller than the size of the y-stage 120 in the x-direction, and thus, the x-stage 110 does not protrude from the y-stage 120 even if the x-stage 110 moves over its entire moving area (e.g. 60 mm), as shown in the diagram. Accordingly, if the size of the exterior cover 300 in the x-direction is a size that covers the y-stage 120, the x-stage 110 does not come into contact with inner walls of the exterior cover 300. That is to say, if the size of the exterior cover 300 in the x-direction is a size that covers the y-stage 120 in the x-direction, the exterior cover 300 can cover the entire moving area (e.g. about 30 mm on the left and right sides, including a tolerance) of the x-stage. Note that, giving consideration to some degree of deformation of the exterior cover 300 due to an external force applied thereto, it is preferable that the size of the exterior cover 300 in the x-direction has an appropriate allowance relative to the size of the y-stage 120 in the x-direction.

As mentioned above, the amount by which the xy-stage 100 moves in the y-direction need only be an amount by which the xy-stage 100 can move in the area of the width (25 mm) of a microscope slide. Accordingly, as shown in FIGS. 7 and 8, the size of the exterior cover 300 in the y-direction is sufficient if it is longer than the size of the y-stage 120 in the y-direction by about 15 mm, for example, including a tolerance for the y-stage 120.

Modification Associated with Arrangement of Components on y-stage 120

The above embodiment has described a configuration in which the x-axis cross roller guides 111b are arranged and the x-wire 173 is laid on the upper face of the y-stage 120, and the y-axis cross roller guides 121a are arranged and the y-wire 174 is laid on the lower face of the y-stage 120. That is to say, the constituent elements for driving the x-stage 110 are arranged on the upper face of the y-stage 120, and the constituent elements for driving the y-stage 120 relative to the stage base 130 are arranged on the lower face of the y-stage 120. In this regard, a description will be given, with reference to FIGS. 10 to 12, of a configuration in which the constituent elements for driving the x-stage 110 in the x-direction and the constituent elements for driving the y-stage 120 in the y-direction are collectively arranged on the lower face of the y-stage 120. According to this configuration, since the cross roller guides for the x-direction and the y-direction are arranged on the same face, the size of the xy-stage 100 in the height direction during assembly can be further reduced, that is, the thickness of the xy-stage 100 can be further reduced.

Figure 10:
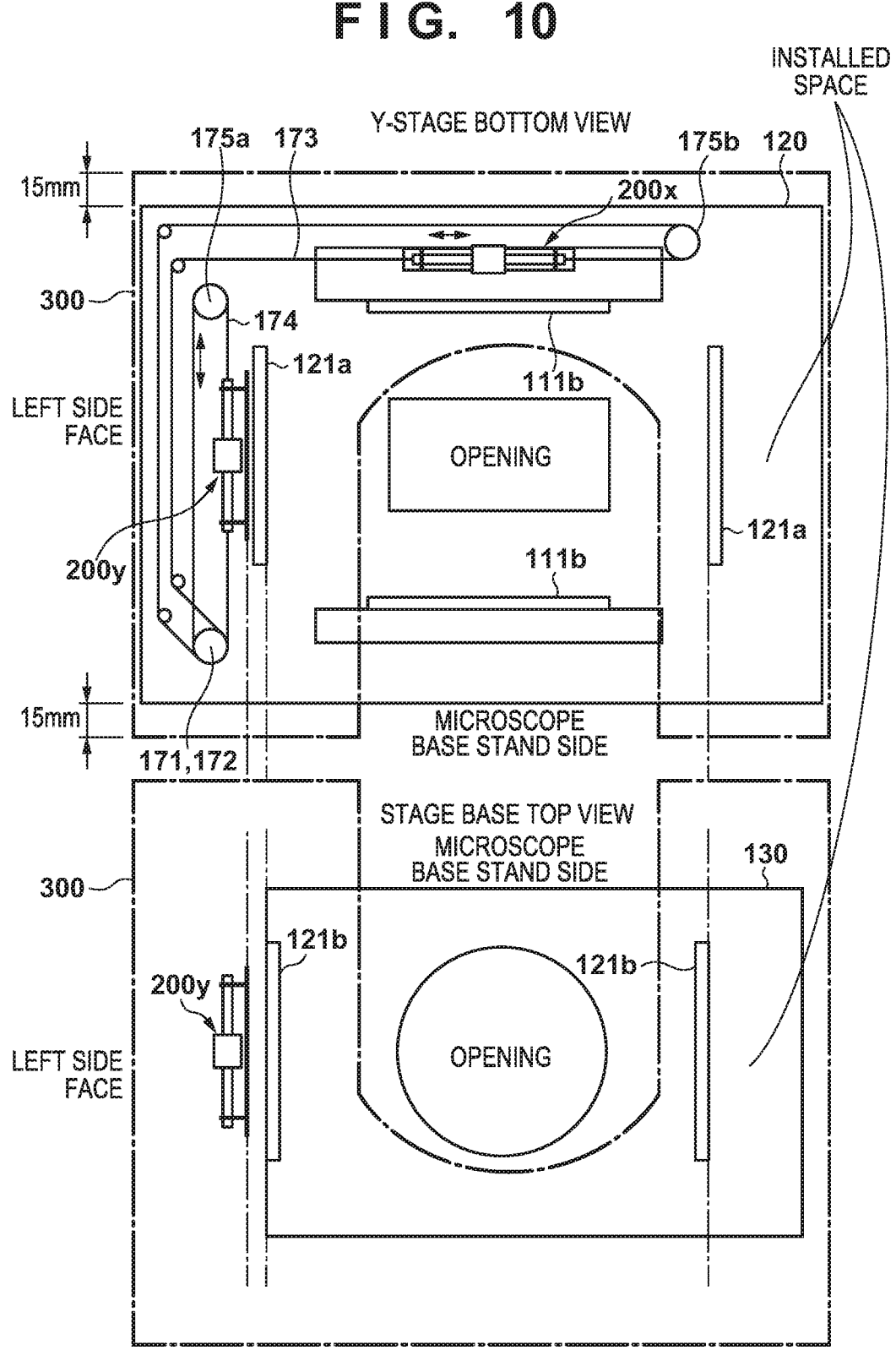
FIG. 10 shows an example of arrangement of constituent components on the y-stage according to a modification.

FIG. 10 schematically shows an arrangement of constituent components associated with driving of the stages on the lower face of the y-stage 120 and the upper face of the stage base 130. Note that, since FIG. 10 is a schematic diagram for illustrating the arrangement of the constituent components, the size, the position, and the shape of the opening portions provided in the stages, the arranging positions and the size of the constituent components, and so on, do not necessarily coincide with those in the configuration diagram of the stages shown in FIGS. 3 and 5.

The y-axis cross roller guides 121a and the outer enveloping member 201y of the linear actuator 200y are fixed to the lower face of the y-stage 120. The y-wire 174 is wound around the y-pulley 172 and the pulley 175a, the linear actuator 200y is installed such that the y-wire 174 and the shaft 202y are coaxial with each other, and the y-wire 174 is connected to the wire connecting portions 204y. Furthermore, the x-axis cross roller guides 111b are fixed to the lower face of the y-stage 120. Also, the outer enveloping member 201x of the linear actuator 200x is fixed to the y-stage 120 via a bracket (not shown). The x-pulley 171 is arranged so as to coaxially overlap the y-pulley 172 in the vertical direction (z-direction), and the x-wire 173 is wound around the x-pulley 171 and the pulley 175b. The linear actuator 200x is installed such that the x-wire 173 and the shaft 202x are coaxial with each other, and the x-wire 173 is connected to the wire connecting portions 204x.

Similarly to FIG. 7, the frame 203y for holding the shaft 202y of the linear actuator 200y for driving the y-stage 120 in the y-direction is fixed to the stage base 130 via the bracket 181a, for example. The y-axis cross roller guides 121b are arranged on the upper face of the stage base 130. The y-axis cross roller guides 121a are configured to hold the y-axis cross roller guides 121b from outer sides thereof, and the y-stage 120 can move in the y-direction relative to the stage base 130. Thus, if the shaft 202y is driven in the y-direction, the y-stage 120 moves in the y-direction relative to the stage base 130. Note that, similarly to FIG. 7, the position at which the exterior cover 300 is attached is also denoted by dash-dot lines in FIG. 10.

Figure 11:
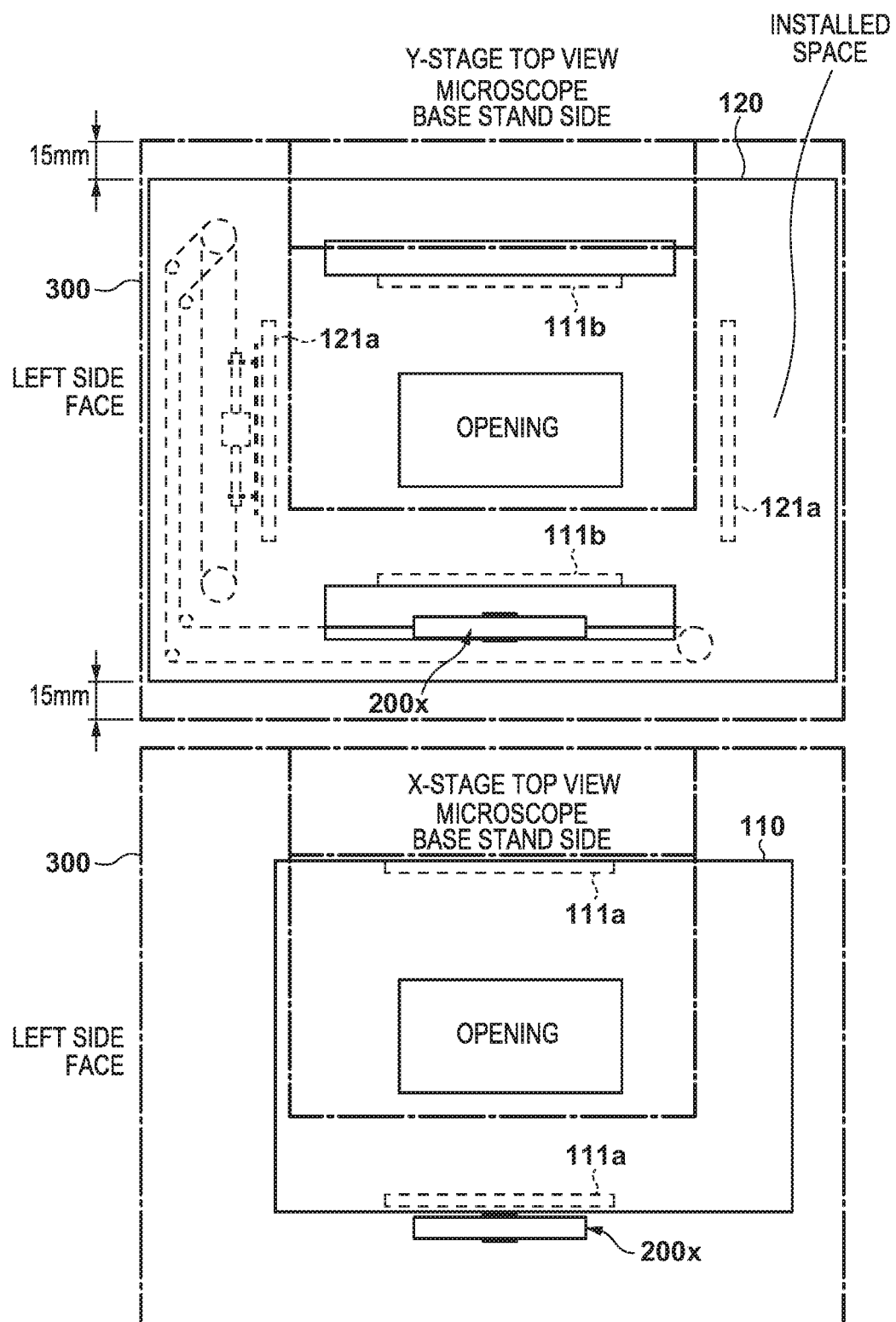
FIG. 11 shows an example of arrangement of constituent components on the y-stage according to the modification.

FIG. 11 shows the upper face of the y-stage 120. Since the constituent components for driving the stages are arranged on the lower face of the y-stage 120 as shown in FIG. 10, no constituent component is arranged on the upper face of the y-stage 120. Accordingly, the gap between the y-stage 120 and the x-stage 110 can be made smaller, and the size of the xy-stage 100 in the height direction can be reduced. Two x-axis cross roller guides 111a are fixed to the x-stage 110 via brackets (not shown), and are fixed so as to hold two x-axis cross roller guides 111b, which are fixed to the y-stage 120, from outer sides thereof. Thus, the x-stage 110 is stacked on the y-stage 120 so as to be able to move in the x-direction relative to the y-stage 120. Note that, since the x-axis cross roller guides 111a are fixed to the x-stage 110 via brackets, the y-stage 120 is provided with openings through which the brackets are passed, along the x-axis cross roller guides 111b. In FIG. 11 as well, the position at which the exterior cover 300 is attached is indicated by dash-dot lines.

Figure 12:
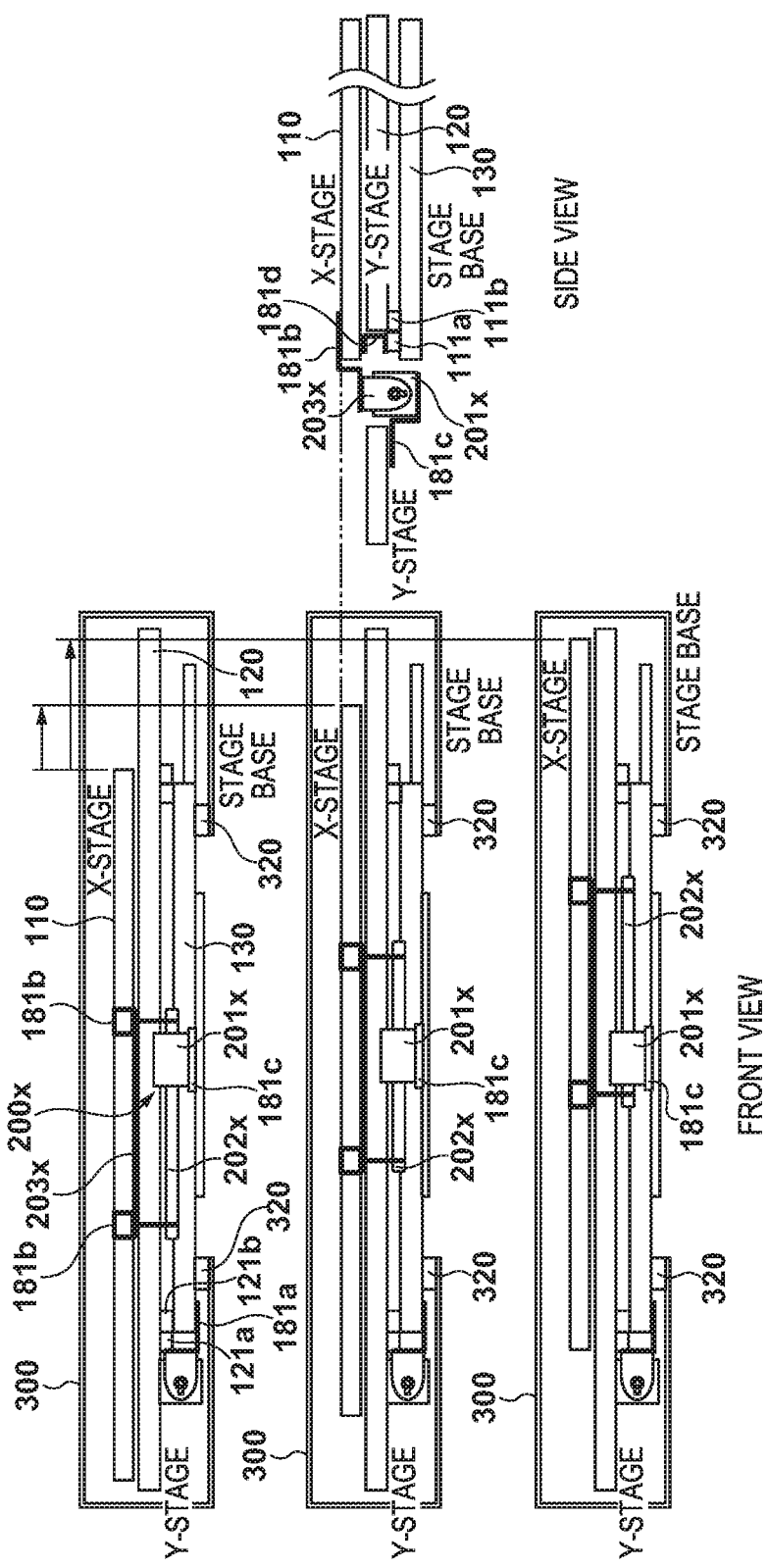
FIG. 12 illustrates an example of a stacking state of the x-stage, the y-stage, and the stage base.

FIG. 12 shows a stacking state of the x-stage 110, the y-stage 120, and the stage base 130. The x-axis direction cross roller guides 111 are not present between the x-stage 110 and the y-stage 120, and the thickness of the xy-stage 100 in the z-direction is smaller than that in the structure shown in FIG. 9. Also, in order to coaxially connect the x-wire 173 laid on the lower face of the y-stage 120 and the shaft 202x of the linear actuator 200x to each other, the position of the shaft 202x needs to be lower than the lower face of the y-stage 120. For this reason, the frame 203x is fixed to the x-stage 110 via brackets 181b. Furthermore, in order to make the x-axis cross roller guides 111b fixed to the lower face of the y-stage 120 and the x-axis cross roller guides 111a oppose each other, the x-axis cross roller guides 111a are fixed to the x-stage 110 via brackets 181d. Note that the brackets 181d may also be configured integrally with the mechanism on the x-stage 110 in order to firmly hold the cross roller guides. Brackets 181c are brackets for fixing the outer enveloping member 201x of the linear actuator 200x for the x-direction to the y-stage 120, and allow the position of the outer enveloping member 201x in the z-direction to be adjusted so as to be aligned with the position of the shaft 202x.

In the example shown in FIGS. 10 and 11 as well, the size of the exterior cover 300 is sufficient if it is longer than the size of the y-stage 120 by about 15 mm, for example, including a tolerance on the upper and lower sides of the y-stage 120, similarly to FIGS. 7 and 8. Also, in the example in FIG. 12 as well, the size of the x-stage 110 in the x-direction is sufficiently smaller than the size of the y-stage 120 in the x-direction, similarly to FIG. 9. For this reason, if the size of the exterior cover 300 in the x-direction is a size that covers the y-stage 120 in the x-direction, the exterior cover 300 can cover the entire moving area (e.g. about 30 mm on the left and right sides, including a tolerance) of the x-stage. However, in the case of FIG. 12, the cross roller guides for both the x-axis and the y-axis on the y-stage 120 are installed on the lower face of the y-stage 120, and thus, the size of the xy-stage 100 in the height direction (z-direction) is smaller than that in FIG. 9. For this reason, the size of the exterior cover 300 in the height direction can be made smaller than that in the case of FIG. 9.

Figure 13:
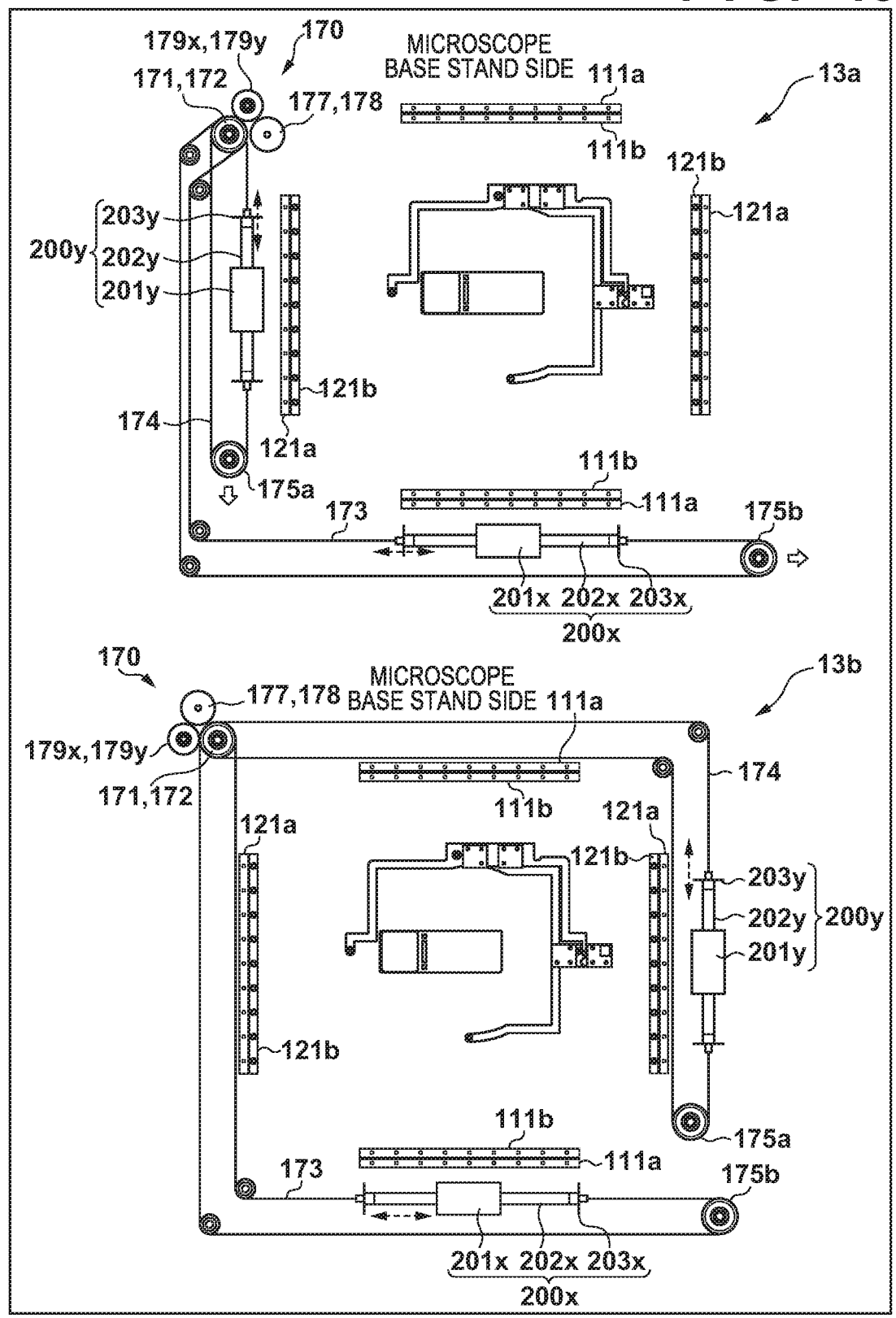
FIG. 13 illustrates an example of arrangement of the linear actuators.

Next, 13a in FIG. 13 denotes a layout of the x-axis cross roller guides 111, the y-axis cross roller guides 121, the linear actuator 200x for the x-direction, the linear actuator 200y for the y-direction, the manual driving mechanism 170, the x-wire 173, and the y-wire 174, which have been illustrated in FIGS. 7, 8, 10, and 11. Note that 13a shows a state where the constituent elements are arranged, without distinguishing between the upper face and the lower face of the y-stage 120. In the manual driving mechanism 170, in regard to movement of the x-stage 110 in the x-axis direction, an x-roller 177, which is connected to a shaft of the x-knob 161, rotates in accordance with the rotating operation of the x-knob 161. An x-transmission roller 179x presses the x-roller 177 and the x-pulley 171 at the time of manual driving, and transmits rotation of the x-roller 177 to the x-pulley 171. Thus, manual driving is switched to and from electrical driving by switching between pressing and releasing of the x-roller 177 and the x-pulley 171 using the x-transmission roller 179x. As for movement of the y-stage 120 in the y-direction, a y-roller 178, which is connected to a shaft of the y-knob 162, rotates in accordance with the rotating operation of the y-knob 162. A y-transmission roller 179y presses the y-roller 178 and the y-pulley 172 at the time of manual driving, and transmits rotation of the y-roller 178 to the y-pulley 172.

13b in FIG. 13 denotes another example layout of the y-wire 174. According to the layout denoted by 13b, the positions at which the manual driving mechanism 170 and the linear actuators 200x and 200y are arranged are distributed, and thus the stage is better balanced. However, the distance by which the x-wire 173 is led increases.

As described above, according to the xy-stage 100 in this embodiment, the shaft 202, which is a driven portion at the time of electrical driving, and the driving wire, which is a driven portion at the time of manual driving, have the same operational axis parallel to the moving direction of a corresponding stage. Thus, the position of the xy-stage is stably kept during switching between electrical driving using a shaft motor (a linear motor using a shaft, or a cylindrical linear motor if the shaft is cylindrical), which is not likely to cause backlash, and manual driving using the manual knob 160. Accordingly, for example, if the xy-stage 100 is used as a microscope stage, the observing position does not shift at the timer of switching between electrical driving and manual driving, and a user can make observations using a microscope without any stress.

FIG. 14 is a perspective view of the stage apparatus 30 for illustrating an operation to load a microscope slide using the upper face of the exterior cover 300. For the loading operation, the x-stage 110 and the y-stage 120 of the xy-stage 100 move to a predetermined position. After the xy-stage 100 has moved to the predetermined position, the placement portion 101 is located adjacent to the first flat portion 301, and operations to load and unload a microscope slide between the first flat portion 301 and the placement portion 101 can be performed. This predetermined position of the xy-stage 100 is preferably defined as a home position of the xy-stage 100. Movement of the xy-stage 100 to the home position may be performed by the user operating the manual knob 160, or a control unit (not shown) may perform driving control of the xy-stage 100 to return the xy-stage 100 to the home position. In the case of automatically returning the xy-stage 100 to the home position using the control unit, a configuration can be established in which movement to the home position is started by the user pressing the home button 306a. Also, microscope slides that are to be observed are placed on the second flat portion 302 (14a), and there is little risk of the microscope slides falling off, due to the wall portion 304 for preventing microscope slides from falling off.

The user slides a microscope slide 1401, which is located at a position closest to the first flat portion 301, from the second flat portion 302 to the first flat portion 301 (14b), and further slides the microscope slide 1401 in the rightward direction (14c). Thus, the microscope slide 1401 is placed on a loading face of the placement portion 101 at a loading preparation position (14d). In this state, the microscope slide located at the loading preparation position is moved to a loading completion position (a position at which the microscope slide is to be observed), at which a hole 102 is provided, and the loading is thus completed.

Figure 17:
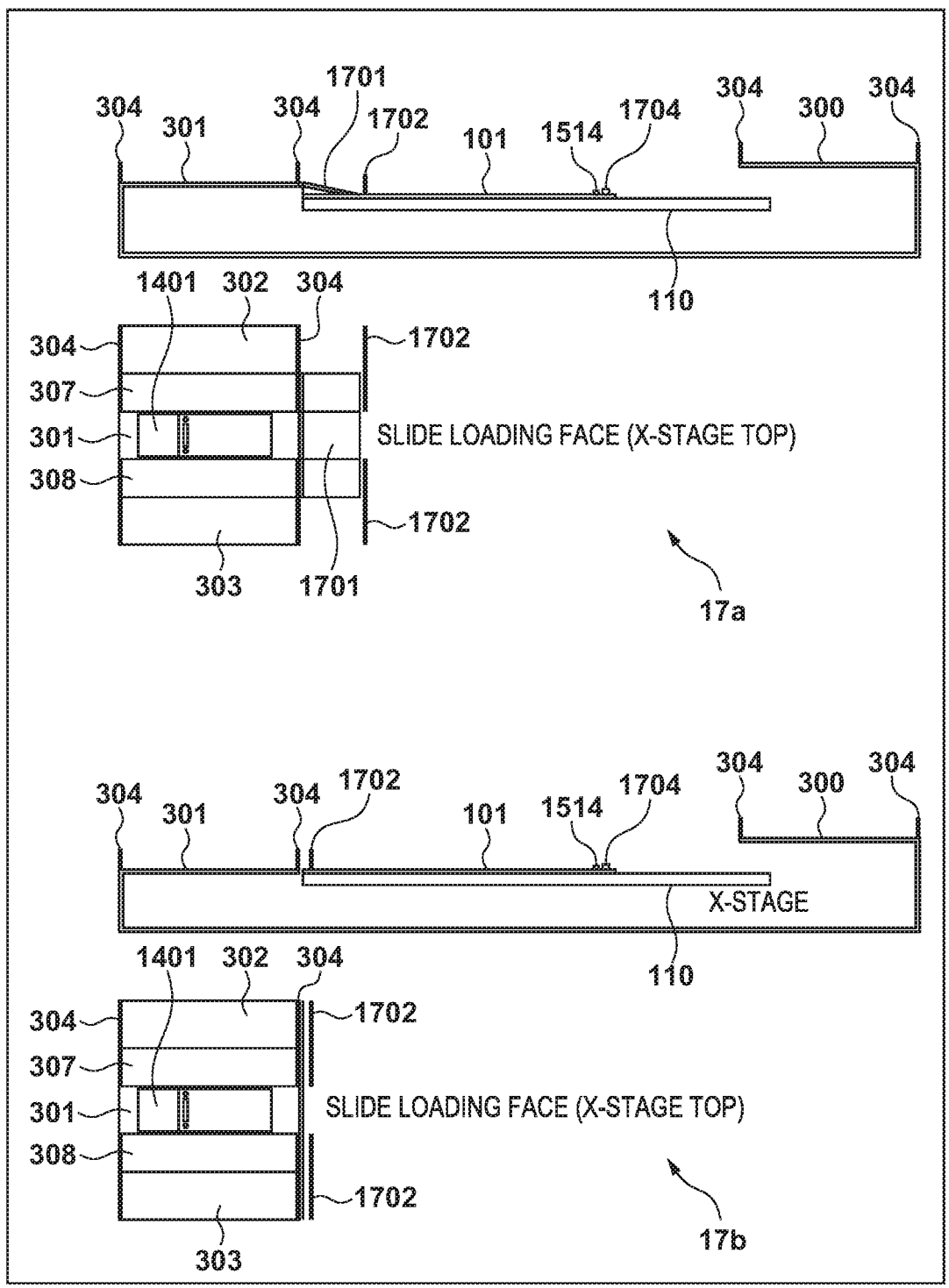
FIG. 17 illustrates a relationship between a slide loading face of the placement portion and the height of the exterior cover.

In FIG. 17, 17a denotes a cross-sectional view showing a structure of the first flat portion 301 and a slide loading face of the placement portion 101. The placement portion 101 has a slope 1701, which gently connects the slide loading face at the loading preparation position at which a microscope slide is to be received from the first flat portion 301, and the first flat portion 301 to each other, over a step therebetween. The user slides a microscope slide from the first flat portion 301 to the loading face via the slope 1701, and abuts the microscope slide against a stopper 1704. This state is a loading-prepared state. The user may also be notified that the microscope slide is in the loading-prepared state by giving, using the indicator 305, a notification that the presence of the microscope slide has been detected by a loading preparation sensor 1514. The placement portion 101 also has a wall portion 1702. If the xy-stage 100 is located at a predetermined position (e.g. the home position) for the loading operation, the placement portion 101 is located adjacent to the first flat portion 301, and a microscope slide can then pass through an opening portion of the wall portion 1702 and an opening portion of the wall portion 304. Thus the microscope slide placed on the first flat portion 301 can be moved to the slide loading face.

A microscope slide in a state denoted by 14*d* in FIG. 14 may be moved to the loading completion position by the user directly operating the microscope slide, but there is a possibility that the user will drop the microscope slide into the hole 102. Also, an operation to fix the microscope slide at the loading completion position is required separately. For this reason, a moving mechanism may also be provided that moves a microscope slide between the loading preparation position and the loading completion position and fixes the microscope slide at the loading completion position. This moving mechanism will be described with reference to FIG. 15A.

Figure 15A:
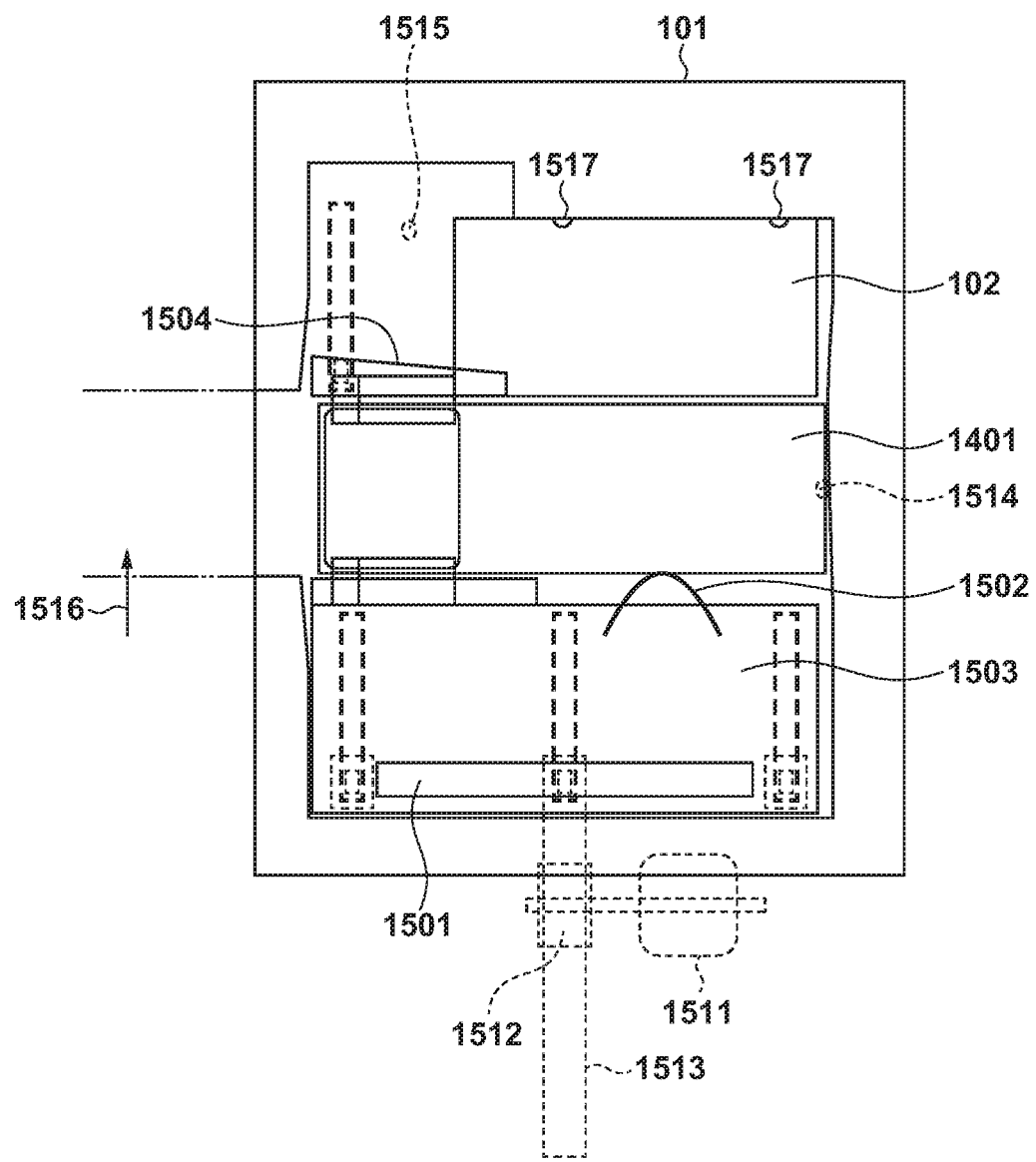
FIG. 15A shows an example of a configuration of the placement portion.

FIG. 15A shows an example of the moving mechanism that is provided in the placement portion 101 and moves the microscope slide 1401 placed at the loading preparation position to the loading completion position. FIG. 15A shows a state where the microscope slide 1401 is placed at the loading preparation position in the placement portion 101. As a result of the control unit (not shown) controlling driving of a motor 1511 based on signals from the loading preparation sensor 1514 and a loading completion sensor 1515, the microscope slide 1401 moves between the loading preparation position and the loading completion position. Note that the control unit can be provided in an empty space on the y-stage, or a space within the exterior cover 300.

Upon the microscope slide 1401 being moved to the loading preparation position, the loading preparation sensor 1514 turns on. If, at this time, the loading completion sensor 1515 is off (if there is no other microscope slide at the loading completion position), the control unit rotates the motor 1511 to move the microscope slide 1401 to the loading completion position. A pinion gear 1512 is attached to a rotary shaft of the motor 1511, and a rack 1513 moves in parallel due to the rotation of the pinion gear 1512. Thus, a loading plate 1503 moves in a direction indicated by an arrow 1516, and pushes the microscope slide 1401 to the loading completion position. Upon the microscope slide 1401 reaching the loading completion position and the loading completion sensor 1515 turning on, the control unit stops the motor 1511. The microscope slide 1401 is pushed against stoppers 1517, which are provided at the loading completion position, and are thus fixed, by a spring member 1502, which is provided on the loading plate 1503.

The loading operation is as described above. Note that the motor 1511 may be automatically started in accordance with the loading preparation sensor 1514 turning on, or may be started in accordance with the load button 306*b* being pressed by the user.

An ejection operation is started in accordance with the user operating the eject button 306*c*, for example. If the eject button 306*c* is pressed, the loading preparation sensor 1514 is off, and the loading completion sensor 1515 is on, the control unit rotates the motor 1511 in a direction opposite to the direction at the time of loading. Thus, the loading plate 1503 and a lever member 1504 move in a direction opposite to the direction indicated by the arrow 1516. The microscope slide 1401 is pushed by the lever member 1504 and moves to the loading preparation position. Upon the microscope slide 1401 reaching the loading preparation position, the loading preparation sensor 1514 turns on, and the control unit stops rotating the motor 1511.

An example configuration of a moving mechanism that enables automatic loading has been described thus far. The microscope slide 1401 may alternatively be manually moved from the loading preparation position to the loading completion position. For example, in FIG. 15A, the loading operation and the ejection operation may be enabled by manually operating a loading bar 1501, which is fixed to the loading plate 1503. FIG. 15B shows an example configuration in the case of enabling the loading operation and the ejection operation through a manual operation. Note that, as shown in FIG. 15B, the opening in the exterior cover 300 needs to be increased to allow the user to operate the loading bar 1501.

In FIG. 15B, 15*a* denotes a top view in the case where the microscope slide 1401 is at the loading preparation position. If, in this state, the loading bar 1501 is pushed to move the microscope slide 1401 to the loading completion position, a state denoted by 15*b* is entered. More specifically, if the loading bar 1501 is pushed, the loading plate 1503 pushes the microscope slide 1401 to the loading completion position. The microscope slide 1401 is pushed against the stoppers 1517 provided at the loading completion position, and are thus fixed by the spring member 1502 provided on the loading plate 1503. Note that, if the loading completion sensor 1515 turns on, the indicator 305 provided on the exterior cover 300 makes a notification indicating that the microscope slide 1401 is at the loading completion position. If, in the state denoted by 15*b*, the loading bar 1501 is pulled, the lever member 1504 also withdraws as the loading plate 1503 withdraws, and the microscope slide 1401 moves to the loading preparation position. As described above, the placement portion 101 has the loading preparation position for receiving a microscope slide that has been moved from the first flat portion 301, the loading completion position at which the microscope slide is placed when being observed with the microscope 10, and the moving mechanism for moving the microscope slide between these positions.

Although no hole is provided in the slide loading face at the loading preparation position, the hole 102 for letting illumination light pass therethrough from below is provided at the loading completion position. A microscope slide may be dropped from the hole 102 if the user is to directly place the microscope slide. With the placement portion 101 in this embodiment, first, a microscope slide is placed at the loading preparation position at which no hole is present, and the microscope slide is then moved to the loading completion position using the loading bar 1501, thereby reducing the likelihood of the user dropping the microscope slide into the hole 102.

Figure 16:
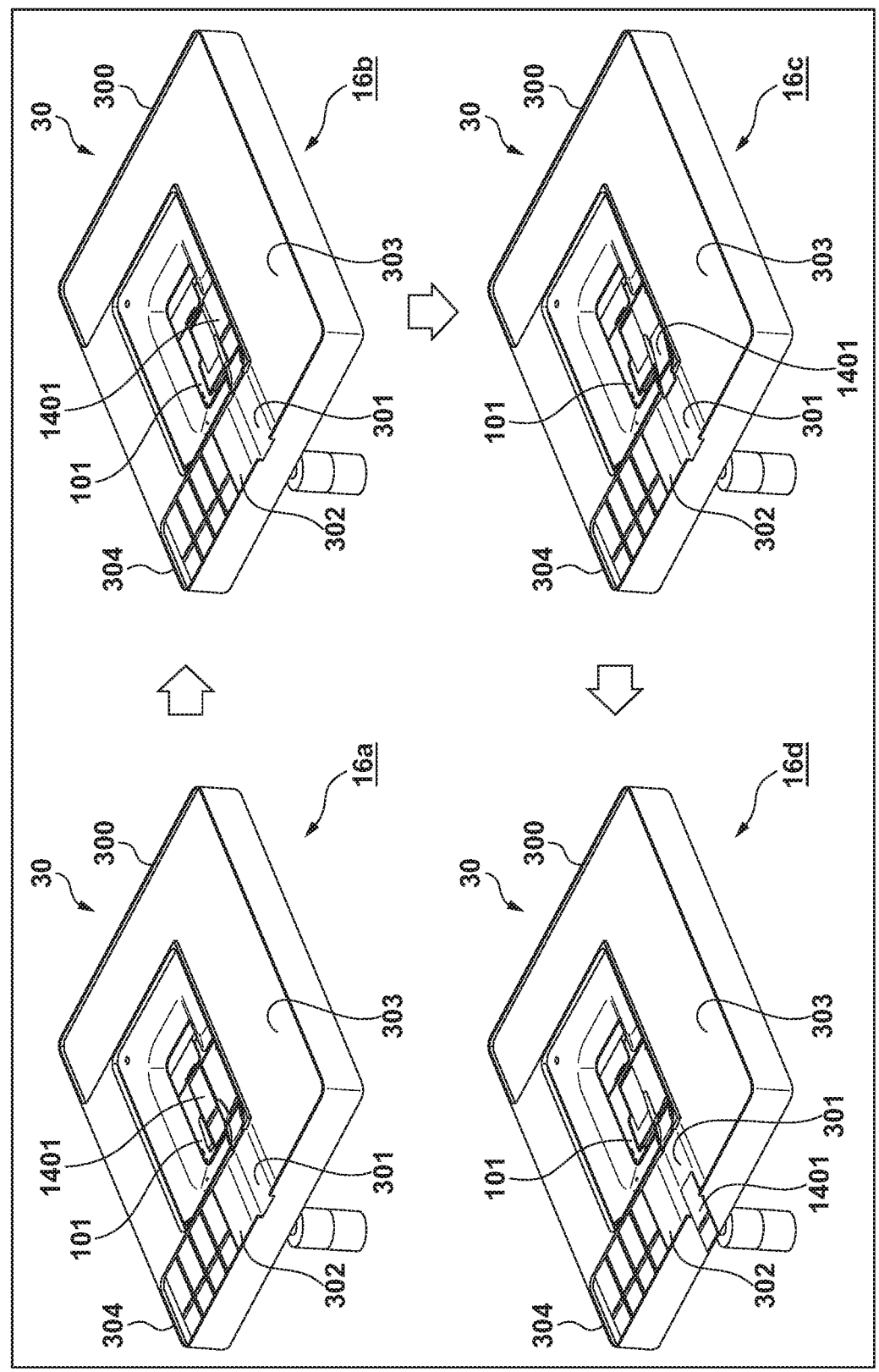
FIG. 16 illustrates an operation to unload a microscope slide from the placement portion.

Next, an operation to unload a microscope slide will be described with reference to FIG. 16. FIG. 16 shows a flow of an operation performed to take out a microscope slide after observation has ended. To unload a microscope slide, first, the user moves the xy-stage 100 to a predetermined position (the home position in this embodiment) such that the loading preparation position on the placement portion 101 is adjacent to the first flat portion 301 (16*a*). Upon the user pressing the eject button, the motor 1511 is driven and the microscope slide 1401 located at the loading completion position thus moves to the loading preparation position (16*b*), as described with reference to FIG. 15A. Alternatively, the microscope slide 1401 located at the loading completion position is manually moved to the loading preparation position through an operation of the loading bar 1501, as described with reference to FIG. 15B. In this state, the user slides the microscope slide 1401 in the leftward direction (toward the first flat portion 301). Thus, the microscope slide 1401 is moved to the first flat portion 301 (16*c*). The wall portion 304 has an opening in the first flat portion 301 on the side opposite to the placement portion 101 side, and the microscope slide 1401 can be readily taken out from the upper face of the exterior cover 300 by the user further sliding the microscope slide 1401 in the leftward direction (16d). Alternatively, the microscope slide 1401 can also be moved from the first flat portion 301 to the third flat portion 303.

Note that, in the above embodiment, the slope 1701 is provided (17a in FIG. 17) to absorb the height difference between the placement portion 101 and the first flat portion 301, but this need not be the case. The first flat portion 301 may alternatively be configured to have the same height as the height of the slide loading face of the placement portion 101. In this case, the slope 1701 can be omitted as denoted by 17b in FIG. 17. Otherwise, the configuration is the same as that denoted by 17a.

In the above embodiment, the first flat portion 301, the second flat portion 302, and the third flat portion 303 surround the periphery of the hole in the exterior cover 300. However, the microscope slide placement area is formed in accordance with formation of the wall portion 304, and is therefore not limited to the above embodiment. For example, the microscope slide placement area formed with the first flat portion 301, the second flat portion 302, and the third flat portion 303 may alternatively be provided only leftward of the hole relative to the microscope base stand 11.

The indicator 305 for indicating a state may be an LED, for example. In this case, for example, the state of a microscope slide can be indicated by the color of the light emitted by the LED, using microscope slide detection sensors at the loading preparation position and the loading completion position, for example. For example, a notification can be given as follows.
(1) A slide is manually moved from the first flat portion 301 to the loading preparation position, and the LED emits yellow light upon completion of the movement.
(2) The loading bar 1501 is pushed to move the microscope slide to the loading completion position, and the LED emits blue light upon completion of the movement.
(3) The LED keeps emitting blue light during observation.
(4) After observation has ended, the xy-stage 100 is returned to the predetermined position for the loading and unloading, and the loading bar 1501 is pulled to return the microscope slide to the loading preparation position. The LED emits yellow light upon completion of the movement.
(5) The slide is manually moved from the loading preparation position to the first flat portion 301. The LED turns off upon completion of the movement.

Figure 18:
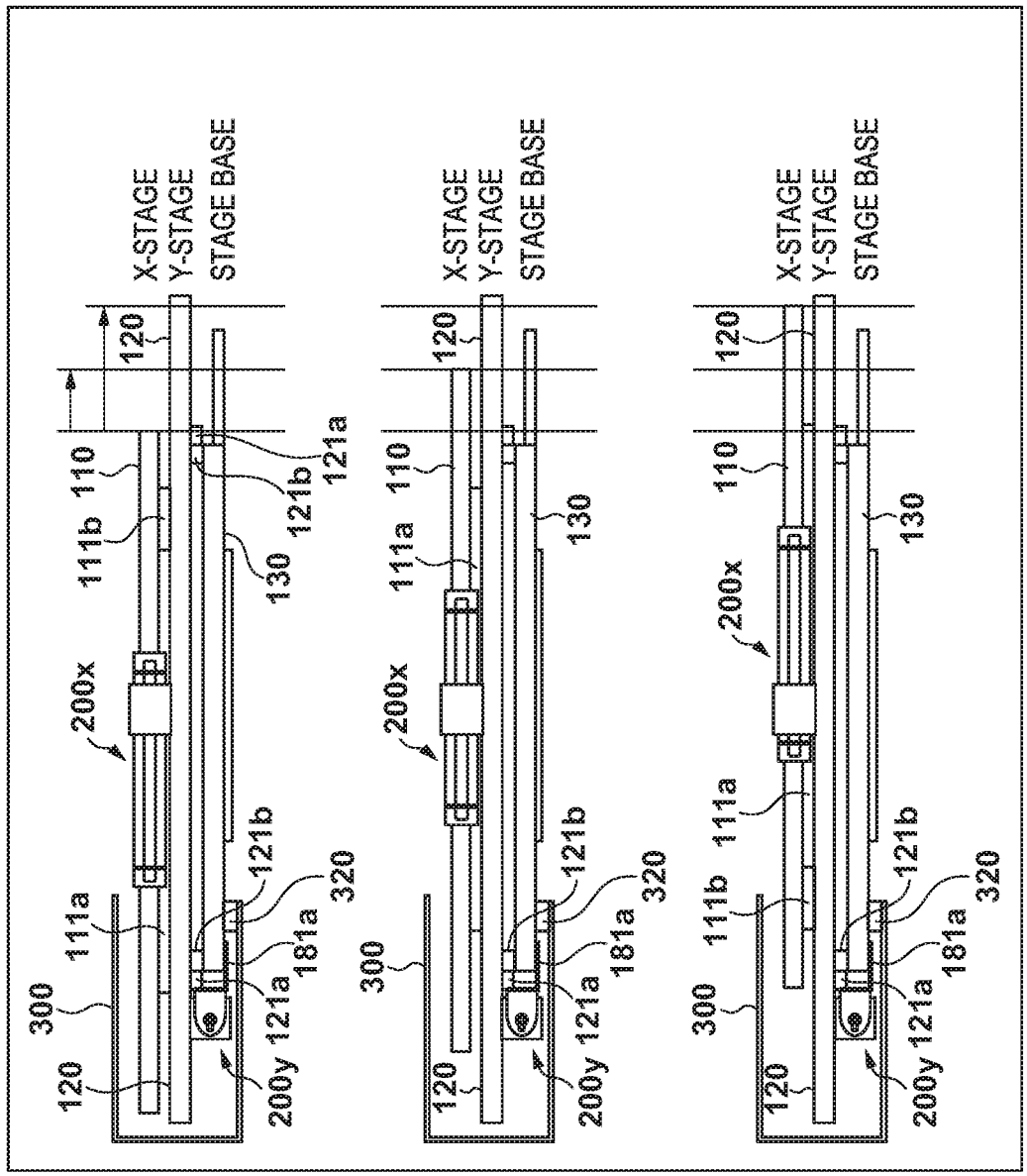
FIG. 18 shows an example of the exterior cover that covers a portion of the xy-stage.

In the above embodiment, the exterior cover 300 covers the entire xy-stage, but this need not be the case. For example, to achieve a structure with which a plurality of microscope slides are placed and are moved to the placement portion 101, the exterior cover 300 may alternatively be provided so as to partially cover the xy-stage 100. For example, FIG. 18 shows an example in which the exterior cover 300 is provided so as to cover only the left side of the xy-stage 100. In this case, the first flat portion 301, the second flat portion 302, and the third flat portion 303 can be formed, and thus, a configuration can be employed that enables the above-described operations associated with loading of a microscope slide. However, if the exterior cover 300 widely covers the xy-stage 100, dust or the like is more unlikely to enter operational mechanisms of the stage, and the reliability increases. If the exterior cover 300 partially covers the xy-stage 100, there is also a concern that a microscope slide will be caught in a gap between the exterior cover 300 and the xy-stage 100. Thus, an exterior cover 300 that covers the entire xy-stage 100 is preferable.

According to the present invention, operability during observation of a microscope slide using a microscope increases.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A stage apparatus for a microscope, comprising:
a first stage provided on a microscope base stand of the microscope and fixed to a stage member that moves in an optical axis direction;
a second stage that relatively moves over a surface of the first stage in a first direction;
a third stage that relatively moves over a surface of the second stage in a second direction, the third stage having a placement portion for placing a microscope slide; and
an exterior cover for covering at least a portion of the second stage and the third stage, the exterior cover being fixed to the first stage or the stage member,
wherein the exterior cover provides a space for the second stage and the third stage to move, and exposes the placement portion of the third stage.
2. The stage apparatus according to claim 1, wherein the exterior cover covers an entire moving area of the second stage and the third stage, and has a hole for exposing the placement portion.
3. The stage apparatus according to claim 1, wherein an upper face portion of the exterior cover has a flat portion for placing a microscope slide, and the flat portion has a wall portion for preventing a microscope slide from falling off an upper face of the exterior cover.
4. The stage apparatus according to claim 1, wherein an amount by which the second stage moves in the first direction is smaller than an amount by which the third stage moves in the second direction, and the second stage is larger than the first stage.
5. The stage apparatus according to claim 1, wherein an upper face portion of the exterior cover includes:
a first flat portion for moving a microscope slide to the placement portion of the third stage;
a second flat portion and a third flat portion for placing a microscope slide, the second flat portion and the third flat portion being provided at a position higher than the first flat portion so as to sandwich the first flat portion;
a first slope portion for connecting the second flat portion and the first flat portion to each other; and
a second slope portion for connecting the third flat portion and the first flat portion to each other.
6. The stage apparatus according to claim 5, wherein the second flat portion, the third flat portion, the first slope portion, and the second slope portion have a wall portion for preventing a microscope slide from falling off, the wall portion extending along an outer periphery of the exterior cover.
7. The stage apparatus according to claim 6, wherein the first flat portion is continuously flat to the outer periphery of the exterior cover, and an opening in which the wall portion is not present in order to allow a microscope slide to pass through the opening, is present in a portion connected to the first flat portion.

8. The stage apparatus according to claim 5, wherein the placement portion has a third slope for gently connecting a portion for placing a microscope slide and the first flat portion to each other over a step therebetween.

9. The stage apparatus according to claim 5, wherein a height of the placement portion and a height of the first flat portion are substantially the same.

10. The stage apparatus according to claim 5, wherein the placement portion has a first area for receiving a microscope slide that has been moved from the first flat portion, and a second area in which a microscope slide is placed when being observed using a microscope, and a microscope slide can be moved between the first area and the second area.

11. The stage apparatus according to claim 10, wherein the placement portion has a mechanism for moving a microscope slide between the first area and the second area.

12. The stage apparatus according to claim 10, wherein when the second stage and the third stage are at respective predetermined positions, the first area of the placement portion and the first flat portion are adjacent to each other.

13. The stage apparatus according to claim 12, wherein the exterior cover has an operation switch for giving a user instruction to move the second stage and the third stage to the respective predetermined positions.

14. The stage apparatus according to claim 12, wherein the exterior cover has an indicator for giving a notification that the second stage and the third stage are at the respective predetermined positions.

15. The stage apparatus according to claim 1, wherein a member for driving the second stage and the third stage is arranged on the second stage, and the second stage is larger than the first stage and the third stage.

16. The stage apparatus according to claim 15, wherein the third stage does not protrude from the second stage in an entire moving area of the third stage in the second direction.

17. The stage apparatus according to claim 1, further comprising:
a first driving unit configured to drive a first driven portion for relatively moving the second stage in the first direction, using a manually-applied driving force; and
a second driving unit configured to drive a second driven portion for relatively moving the second stage in the first direction, using an electrical driving force,
wherein the first driven portion and the second driven portion at least partially have the same operational axis.

* * * * *